(12) United States Patent
Sahu

(10) Patent No.: US 11,868,748 B2
(45) Date of Patent: Jan. 9, 2024

(54) METHOD, APPARATUS, AND COMPUTER-READABLE MEDIUM FOR INTELLIGENT EXECUTION OF A SOLUTION ON A COMPUTER NETWORK

(71) Applicant: INFORMATICA LLC, Redwood City, CA (US)

(72) Inventor: Hemshankar Sahu, Bangalore (IN)

(73) Assignee: Informatica LLC, Redwood City, CA (US)

( * ) Notice: Subject to any disclaimer, the term of this patent is extended or adjusted under 35 U.S.C. 154(b) by 0 days.

(21) Appl. No.: 17/521,855

(22) Filed: Nov. 8, 2021

(65) Prior Publication Data

US 2023/0029801 A1 Feb. 2, 2023

Related U.S. Application Data

(60) Provisional application No. 63/228,006, filed on Jul. 30, 2021.

(51) Int. Cl.
   *G06F 8/41* (2018.01)
   *G06F 9/54* (2006.01)
(52) U.S. Cl.
   CPC ............... *G06F 8/47* (2013.01); *G06F 8/447* (2013.01); *G06F 9/541* (2013.01)
(58) Field of Classification Search
   CPC ............ G06F 8/47; G06F 8/447; G06F 9/541
   See application file for complete search history.

(56) References Cited

U.S. PATENT DOCUMENTS

| | | | |
|---|---|---|---|
| 8,769,696 B2 * | 7/2014 | Pistoia | G06F 21/00 726/25 |
| 9,116,768 B1 * | 8/2015 | Sawhney | G06F 8/60 |
| 9,753,834 B1 * | 9/2017 | Tang | G06F 11/3616 |
| 11,343,352 B1 * | 5/2022 | Golden | H04L 67/60 |
| 2001/0034736 A1 * | 10/2001 | Eylon | H04L 65/70 |
| 2001/0034846 A1 * | 10/2001 | Beery | G06F 21/121 726/28 |
| 2003/0074207 A1 * | 4/2003 | Pace | G06F 8/60 709/204 |
| 2003/0074360 A1 * | 4/2003 | Chen | H04L 69/329 |

(Continued)

*Primary Examiner* — Phillip H Nguyen
(74) *Attorney, Agent, or Firm* — Amardeep S. Grewal; Reed Smith LLP

(57) ABSTRACT

A deployment platform, computer-readable medium, and computer-implemented method for intelligent execution of a solution on a computer network, including receiving an instruction to execute a solution in a local runtime environment on the deployment platform, the solution including solution code written in a solution language, determining, by a helper program on the deployment platform, whether the solution is executable on the deployment platform based on the solution language and either launching, by the helper program, the solution on the deployment platform when the solution is executable on the deployment platform or launching, by the helper program, the solution on a remote platform on the computer network that is configured to execute the solution when the solution is not executable on the deployment platform, the helper program being configured to communicate with the launched solution to enable the launched solution to interface with the local runtime environment on the deployment platform.

15 Claims, 18 Drawing Sheets

(56) References Cited

U.S. PATENT DOCUMENTS

| | | | |
|---|---|---|---|
| 2005/0097082 A1* | 5/2005 | Yan | G06F 9/45516 |
| 2007/0083501 A1* | 4/2007 | Pedersen | G06F 16/10 |
| 2007/0083522 A1* | 4/2007 | Nord | G06F 16/10 |
| 2007/0083610 A1* | 4/2007 | Treder | H04L 67/34 709/217 |
| 2007/0083655 A1* | 4/2007 | Pedersen | H04L 63/102 709/226 |
| 2008/0268828 A1* | 10/2008 | Nagaraja | G06F 9/505 455/419 |
| 2010/0333069 A1* | 12/2010 | Chandra | G06F 8/75 717/126 |
| 2018/0336079 A1* | 11/2018 | Soman | G06F 9/548 |
| 2021/0357496 A1* | 11/2021 | Lewis | G06F 9/445 |

* cited by examiner

METHOD, APPARATUS, AND COMPUTER-READABLE MEDIUM FOR INTELLIGENT EXECUTION OF A SOLUTION ON A COMPUTER NETWORK

RELATED APPLICATION DATA

This application claims priority to U.S. Provisional Application No. 63/228,006 filed Jul. 30, 2021, the disclosure of which is hereby incorporated by reference in its entirety.

BACKGROUND

Users, such as data scientists and software engineers, may have a preference or a familiarity with a particular programming language and prefer to write solutions with the programming language they are most familiar with. For example, User A may prefer to write solutions using Python™, while User B may prefer to write solutions using another programming language such as Apache Spark™ or R. User C may prefer to create certain kinds of solutions with Scala and others with R, using each programming language for its strengths. However, when multiple users wish to collaborate or seek to use the work of others, the use of such heterogeneous programming languages becomes problematic, since existing solutions fail to accommodate solutions developed using different programming languages and fail to allow users to chain together two or more solutions that were built using different programming platforms (e.g. a user cannot use a solution written in a Python™ script with another transform that uses Apache Spark™).

In some cases, a user may have to convert individual solutions from one programming platform to another, which may be inefficient and time consuming. In other cases, a user may have to redevelop the solutions from the very beginning in a common programming platform in which the user(s) lacks skill. This could lead to the execution of the solution being a labor-intensive and a difficult process in the long run.

FIG. 1A illustrates an example of the different technologies that different teams might be working on. At some point in time these teams need to collaborate to integrate the product into a whole. FIG. 1B illustrates the interdependencies between the various teams. For example, to get predictions using the model generated by the Data Science team, from UI, the model needs to be put behind webserver. Similarly, if the Backend/Data Engineering team wants to get predictions from same model, they may want to execute model locally for better performance. Additionally, the Data Science team may want to use a module generated by Data Engineering team for preprocessing/cleaning data before using the data for training a model.

As shown in FIGS. 1A-1B, a large degree of collaboration is required between teams using different languages and/or runtime environment. However, there are currently no systems for facilitating the usage and integration of solutions created by different users that are built using a variety of different programming languages and designed to execute within different runtime environments. While individual teams may be able to custom engineer a solution for integrating a different component produced by other teams, the approach used by the team may not be the most efficient integration option, resulting in unnecessary performance overhead and inefficiencies.

Accordingly, there is a need for systems and methods that enable seamless integration and deployment of solutions written in a variety of languages across different runtime environments.

BRIEF DESCRIPTION OF THE DRAWINGS

FIG. 1A illustrates an example of the different technologies that different teams might be working on.

FIG. 1B illustrates the interdependencies between the various teams.

DETAILED DESCRIPTION

While methods, apparatuses, and computer-readable media are described herein by way of examples and embodiments, those skilled in the art recognize that methods, apparatuses, and computer-readable media for intelligent execution of a solution on a computer network are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "may" is used in a permissive sense (i.e., meaning having the potential to) rather than the mandatory sense (i.e., meaning must). Similarly, the words "include," "including," and "includes" mean including, but not limited to.

As explained above, current systems do not allow for the seamless integration of heterogeneous solutions into different runtime environments. The following use case further illustrate the technical problems associated with this lack of integration. The use case involves running a python program from an Informatica Data Engineering Integration (DEI) product. The additional involved technologies are explained below.

Hadoop—Hadoop is a Big data eco-system where customers can easily process large amount of data. Hadoop manages a cluster with multiple nodes and enables storage and processing of data using resources on these cluster nodes. A user can use frameworks like Spark to process data on a Hadoop eco-system.

Informatica-DEI—Informatica's Data Engineering Integration (DEI) platform is a data integration platform which Data Engineers can use to extract, transform and load data from various sources to various targets. DEI provides a drag and drop way of creating data transformation jobs, called Mappings, which can execute locally or on top of Spark.

Python-Tx—DEI provides various transformations which can be used to create a mapping, and one of them is Python-Tx. Users can use Python-Tx to add custom python code in the mapping. A user has to provide python binaries in DEI or preinstall them on Hadoop cluster nodes.

Figure 2:
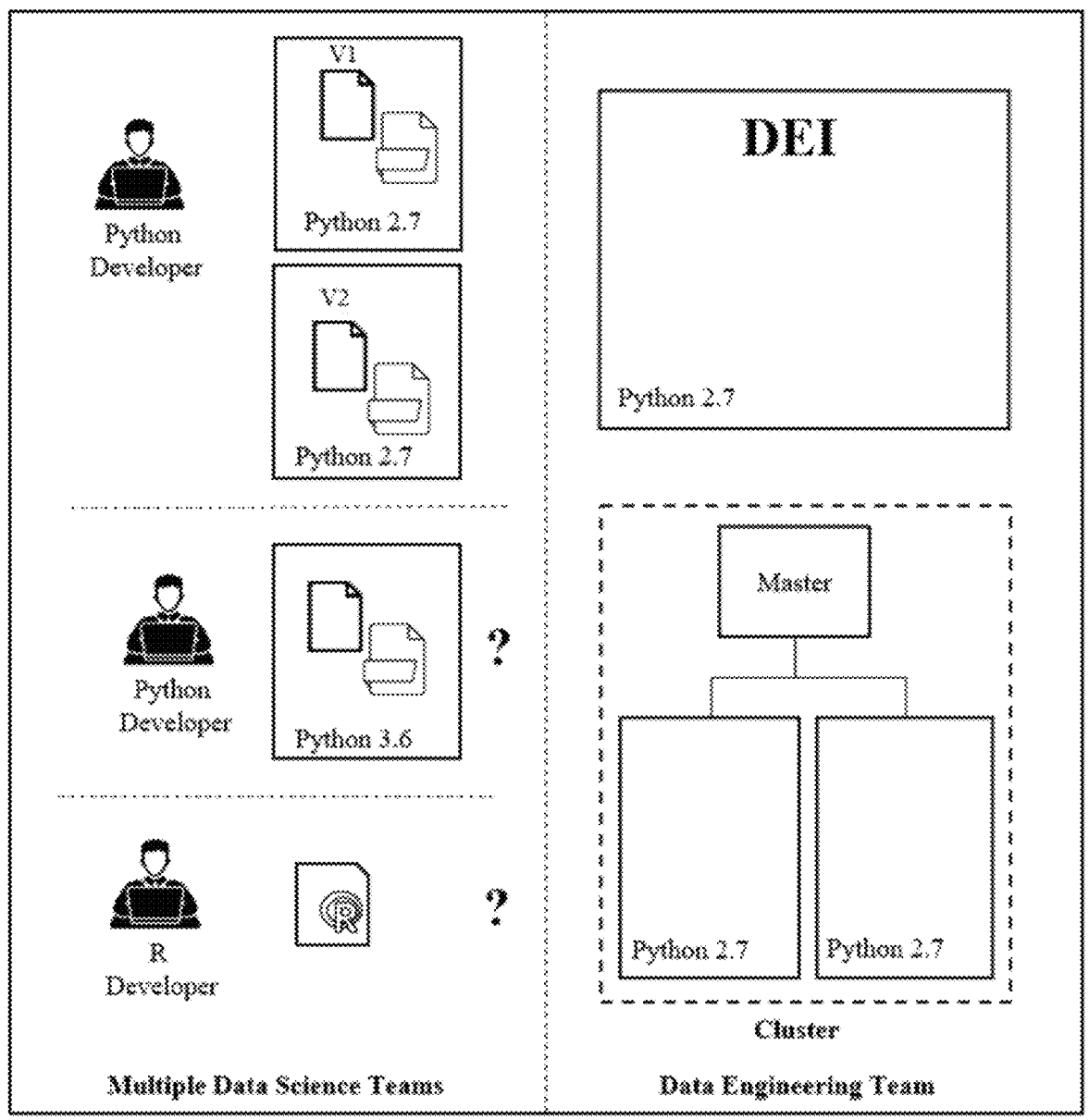
FIG. 2 illustrates an example scenario of integrating a python code provided by Data Scientist with Informatica DEI using Python-Tx by a Data Engineer.

FIG. 2 illustrates an example scenario of integrating a python code provided by Data Scientist with Informatica DEI using Python-Tx by a Data Engineer. DEI Data Engineers are experts in using tools like DEI, while they do not much knowledge of programming. On the other hand, Data Scientist are experts in writing code, but have no experience in using tools like DEI.

As shown in FIG. 2, a first Python developer has implemented two different versions of a solution in Python 2.7, a second Python developer has implemented a solution in Python 3.6, and an R developer has implemented a solution in R. Additionally, in this example, DEI utilizes Python 2.7 for Python-Tx. The following issues arise the illustrated scenario:

Time taken in Team Collaboration—Either the Data Scientist has to understand how his code can be integrated with DEI, or the Data Engineer has to learn some coding skills before he can add code provided by the Data Scientist. Both these will take weeks of time before it can be used in production.

Downtime for each upgrade of new version of code—Once the integration is done, it is quite possible that a new version of the code needs to be reintegrated. This will again have considerable downtime.

Using 2 different versions of python—If one mapping contains multiple Python-Tx, each one requiring a different python version, then this use case will not be supported, because only one runtime can be utilized before running the job.

Data Scientist team using different languages—The Data Scientist may use other language for building their solution, like R, Matlab etc, and as DEI does not have any transformation to support for these other languages, it will not be possible to integrate these solutions easily.

The above-mentioned problems arise for any two teams that depend upon each other to generate an integrated application. While there are ways to perform the required integrations, each of these solutions suffers from different drawbacks.

One solution can be to create a Representational State Transfer (REST) endpoint for the desired solution and share the endpoint with other teams. This approach will have following drawbacks:

Developing the REST endpoint itself requires expertise.

The consumer of the REST endpoint also needs to have some expertise and should handle the corner cases, like retries on failure and timeouts etc.

The REST approach of processing the data is usually not the most efficient way because data needs to be converted to requests and responses needs to be converted to data, extra time is incurred due to network communication, and data may go out of the system so encryption and decryption will be required which will again cost performance overhead.

The REST approach also has added network costs and these costs are significant if terabytes of data are being processed.

Another solution can be to containerize the application/solution so that the consumers can run the container as per their requirement. Containers virtualize the operating system and runtime environment required to execute software. While containerizing an app/solution also solves the problem and avoids the problem of determining dependencies, there are still lot of problems that need to be solved from the consumer's point of view.

Figure 3:
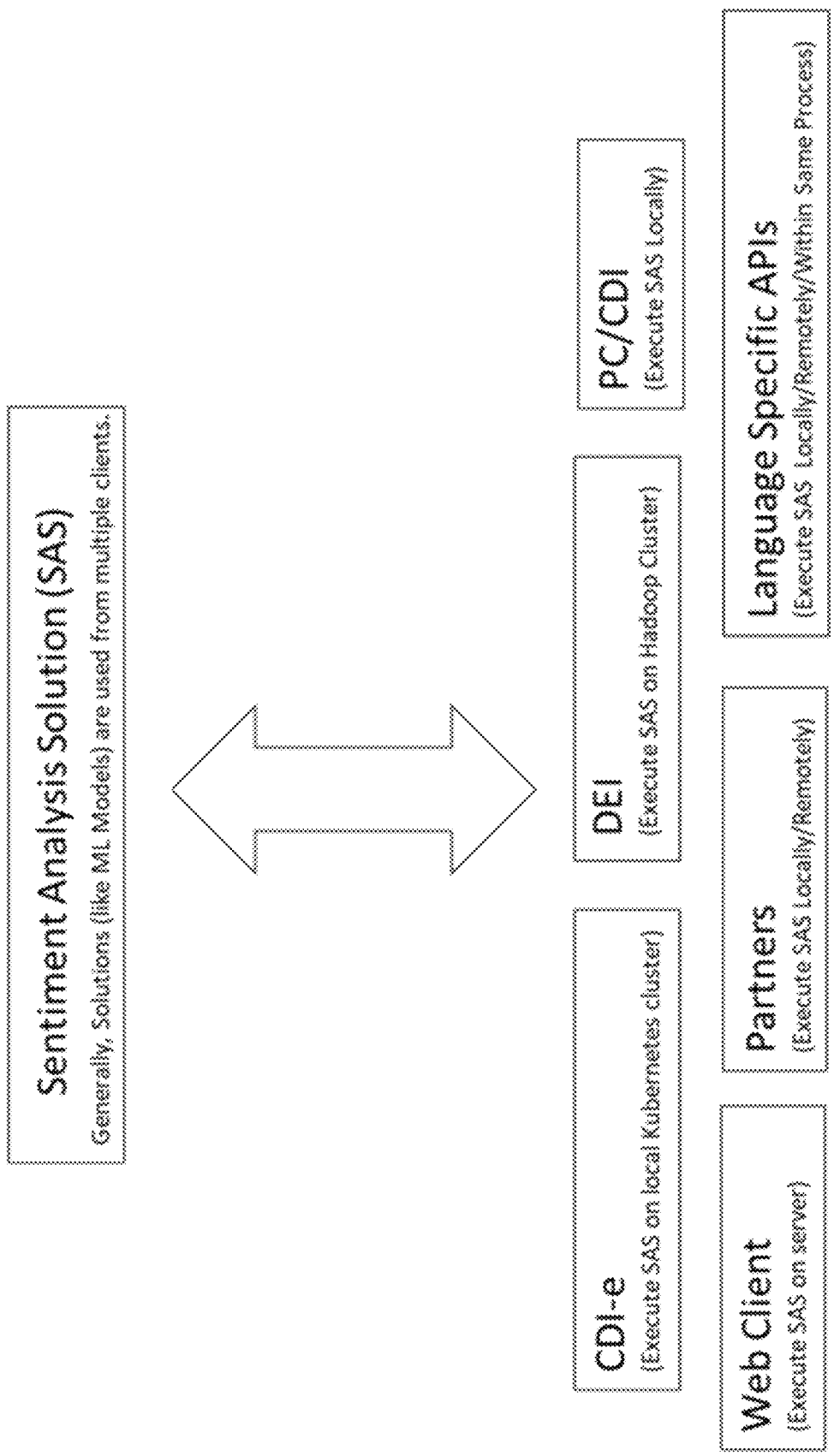
FIG. 3 illustrates processing requirements for different products where a solution can be used.

For example, in a typical organization using an Informatica eco-system for their data processing and management requirements, a data science team within the organization may have developed a solution for sentiment analysis of sentences. The organization might have a number of different products where this solution can be used, but each may have their own processing requirements, as shown in FIG. 3. Each of these are described below.

Web Client/Server: This may have a requirement to execute the solution on a client or a server or remotely.

Informatica Cloud Data Integration Elastic (CDI-e): This will have a requirement to execute the solution on a Kubernetes cluster, which is an open source container orchestration system.

Informatica DEI: This will have a requirement to execute the solution on Hadoop cluster.

Informatica PowerCenter (PC): This will have a requirement to execute the solution locally.

Partner Products: These may have similar requirements to execute locally/on cluster/remotely.

Consuming from various languages: Developers may want to execute locally or remotely using their own choice of language.

Due to these variations, there is no way to share a particular solution with all customers. Additionally, any integration will likely require a significant time commitment both on the part of the solution developer and consumer.

Even assuming that the solution software is available as a container and that a REST Endpoint is exposed, there are still significant challenges to consuming the solution, including:

Creating the REST client, including handling corner cases such as timeouts and retries and handling security.

Implementing multithreading and creating multiple parallel clients and requests and sending data in chunks/batches for better performance with REST (assuming the server supports batching).

Managing containers for local execution, including downloading, starting, stopping, and cleaning containers/images.

Optimizing container usage, including determining how and when to start new container/pods for applications/threads using the same solution locally or remotely. This optimization needs to define, for example, whether to start separate containers for two different solutions even if they can be executed in the same container or whether to use containers when the solution can be executed on tech stack of a client/consumer.

Determining how to localize the containers in the cluster while processing a pipeline. This may vary for a Kubernetes cluster versus a Hadoop Cluster.

As explained above, even with a REST endpoint and containerization, there is a significant amount of time and cost required for integrating and consuming various projects/solutions within a single ecosystem (such as an Informatica ecosystem). The same will be true for different consumption options across different products being used by the organization.

Applicant has discovered a novel method, apparatus, and computer-readable medium for intelligent execution of a solution on a computer network (such as an enterprise ecosystem) that addresses all of the above-mentioned problems. In particular, the Solutions Repository ("SR") and intelligent solution execution method, apparatus, and computer-readable medium disclosed herein provides the following benefits:

It minimizes the time required and overhead for collaboration between teams utilizing different tech stacks, runtime environment, and programming languages.

It packages and deploys solutions so that they are consumable by different products, languages, frameworks in the most efficient way (in terms of computational efficiency, network costs, etc.).

It intelligently determines WHERE to execute a consumable solution based upon the parameters of a particular deployment platform and runtime environment and processes executing on the deployment platform.

It intelligently determines HOW to best execute the solution, in terms of whether to execute the solution within an existing process, within a container, locally, or remotely.

Having determined where and how to execute the solution, the present system seamlessly executes the solution in the optimal manner while maintaining a communication interface with the deployment platform and runtime environment of the process that requires the solution.

Figure 4:
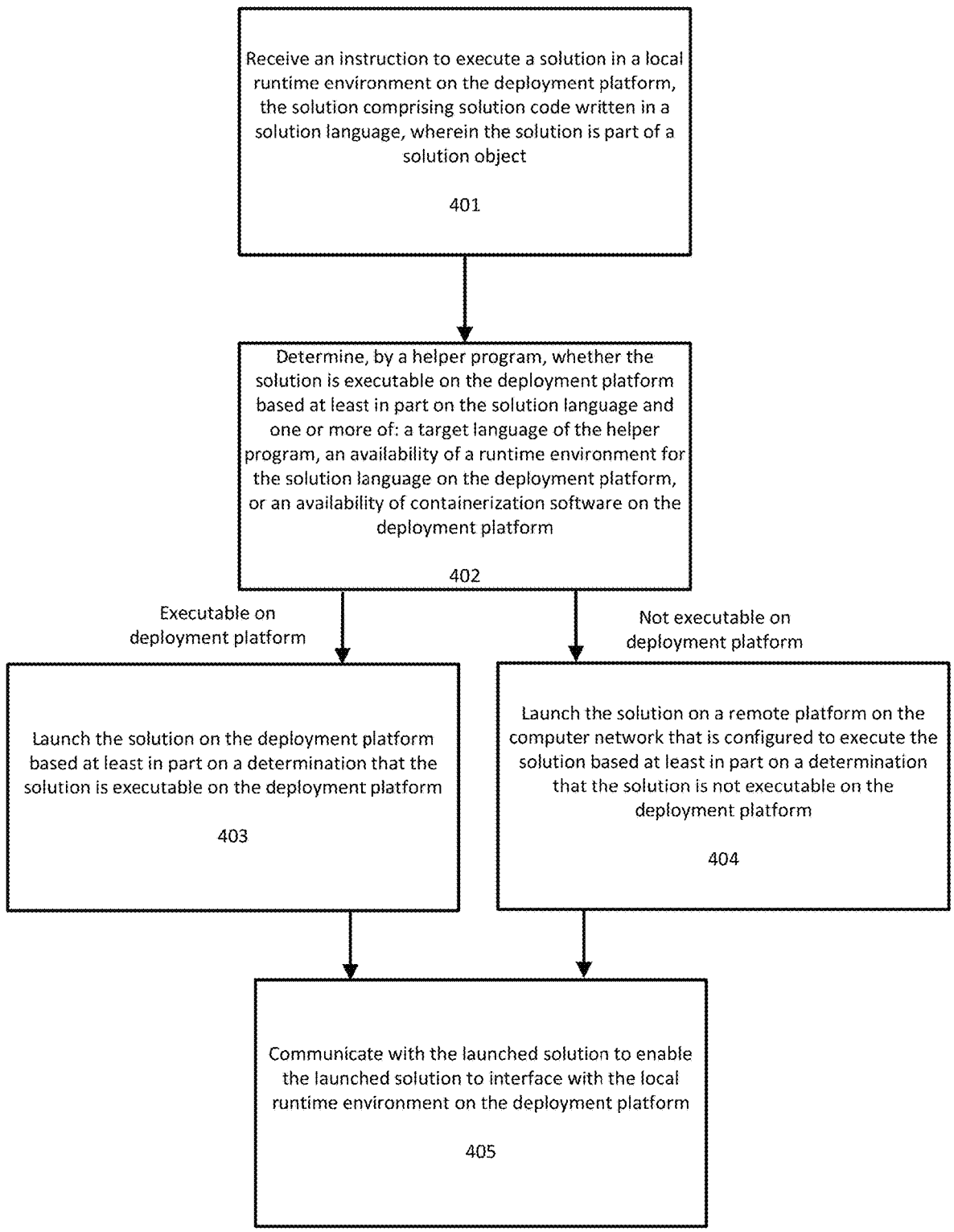
FIG. 4 illustrates a method for intelligent execution of a solution on a computer network according to an exemplary embodiment.

FIG. 4 illustrates a method for intelligent execution of a solution on a computer network according to an exemplary embodiment. The steps shown in FIG. 4 can be performed by one or more computing devices of a deployment platform, such as a client or server device within an enterprise network.

At step 401 an instruction to execute a solution within a local runtime environment on the deployment platform is received by the deployment platform. For example, a user can select an API plugin for a specific language within the local runtime environment and that API can be used to send the instruction to execute the solution. The local runtime environment can be a particular technology platform, development environment, or technology stack. For example, the local runtime environment can be a programming language based environment, such as Python or Java.

The solution includes solution code written in a solution language. The solution language refers the programming language used to write the code and/or the language compiler required to compile and execute the solution code. For example, a solution written in Java would have a solution language of Java. A solution is unit of execution. It contains all the details of HOW data will be processed, i.e. the business logic. As explained below, it is collection of all the metadata and files that the provider of the solution submits.

The instruction to execute the solution can be received via a user interface. For example, a user can select a particular solution from the solution repository for integration into their application or software and runtime environment. The solution can then be deployed on the requesting user's system prior to intelligent execution. As discussed below, the solutions repository can display all deployment options and instructions to use them based on the language or product selected. The user can then select an appropriate option.

Figure 5:
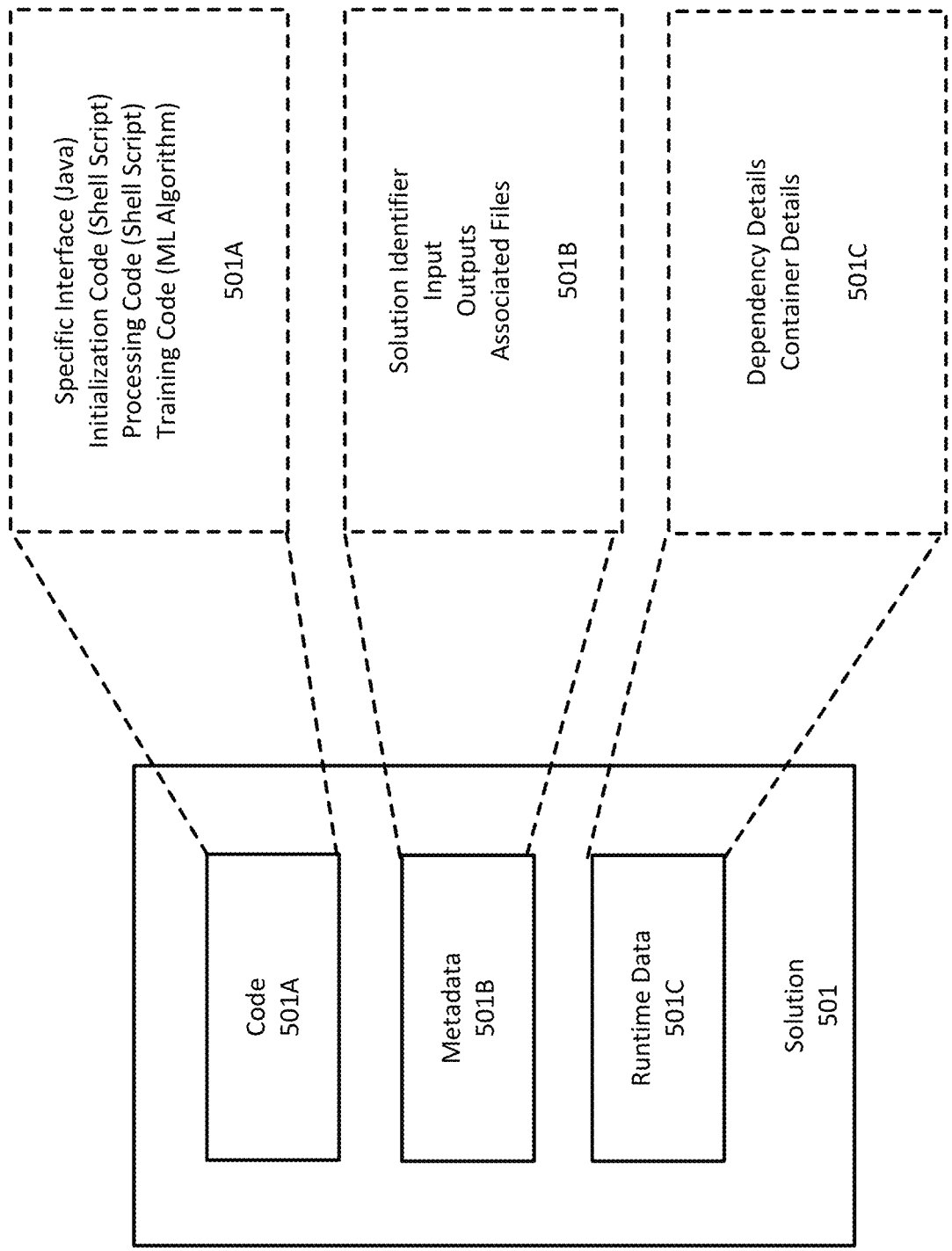
FIG. 5 illustrates the components of a solution according to an exemplary embodiment.

FIG. 5 illustrates the components of a solution according to an exemplary embodiment. As shown in FIG. 5, the solution 501 can include code 501A, metadata 501B, and runtime data 501C.

The contributor/author of the solution provides the code 501A to be executed by the solution. The code should conform to certain requirements. For example, if code is in Java, a specific interface should be implemented. If the code is a shell script, initialization code, processing code, etc. should be provided. If the code is a machine learning algorithm, training code should be provided.

The metadata 501B includes the details required for referencing and using the code. This can include the solution identifier, the inputs to the solution, and the outputs of the solution. The metadata 501B also includes associated files, including the files required to execute the code, such as a configuration file, a model file for machine learning algorithms, etc.

The runtime data 501C includes data which is used by an external agent (e.g., the helper programs, discussed below) to create right environment to execute the code. For example, the runtime data 501C can include dependency details such as installed packages, or external URLs/links to third party libraries required for execution. The runtime data 501C can also include container details, such as the Dockerfile, docker image name, or exported container information for a containerized solution.

The following two examples illustrate possible solutions and associated code, metadata, and runtime data.

Example 1: String Processing in Java

A solution to do a complex string processing in java can have following components:
Code: Java Code implementing specific Interface
Metadata: ID: STR_PRO, Input: String, Output: String
Dependency: Java 8

Example 2: Trained Machine Learning Algorithm in Python

A solution to provide predictions using a complex trained machine learning model can have following components:
Code: Python code implementing specific Interface
Metadata: ID: ML_ALGO, Input: [String], Output: [String, Double]
File: model.pb, labels.txt
Dependency: <Dockerfile>

A solution does not execute by itself, as it has no information on where it is executing and therefore does not have clarity regarding whether all the dependencies are met. Instead, an agent (e.g., a helper program) is used to make sure that environment is properly setup before the solution logic can be executed.

The solution is part of a solution object which aids in the execution of the solution. The solution object can be received and stored on the deployment platform prior to receiving the execute instruction. For example, it can be transmitted to the deployment platform from a remote platform. Alternatively, the solution object can be hosted on the cloud or a remote platform at the time the instruction to execute the solution object is received. The solution can then be deployed on the deployment platform in response to receiving the instruction to execute by transmitting the solution object to the deployment platform.

Figure 6:
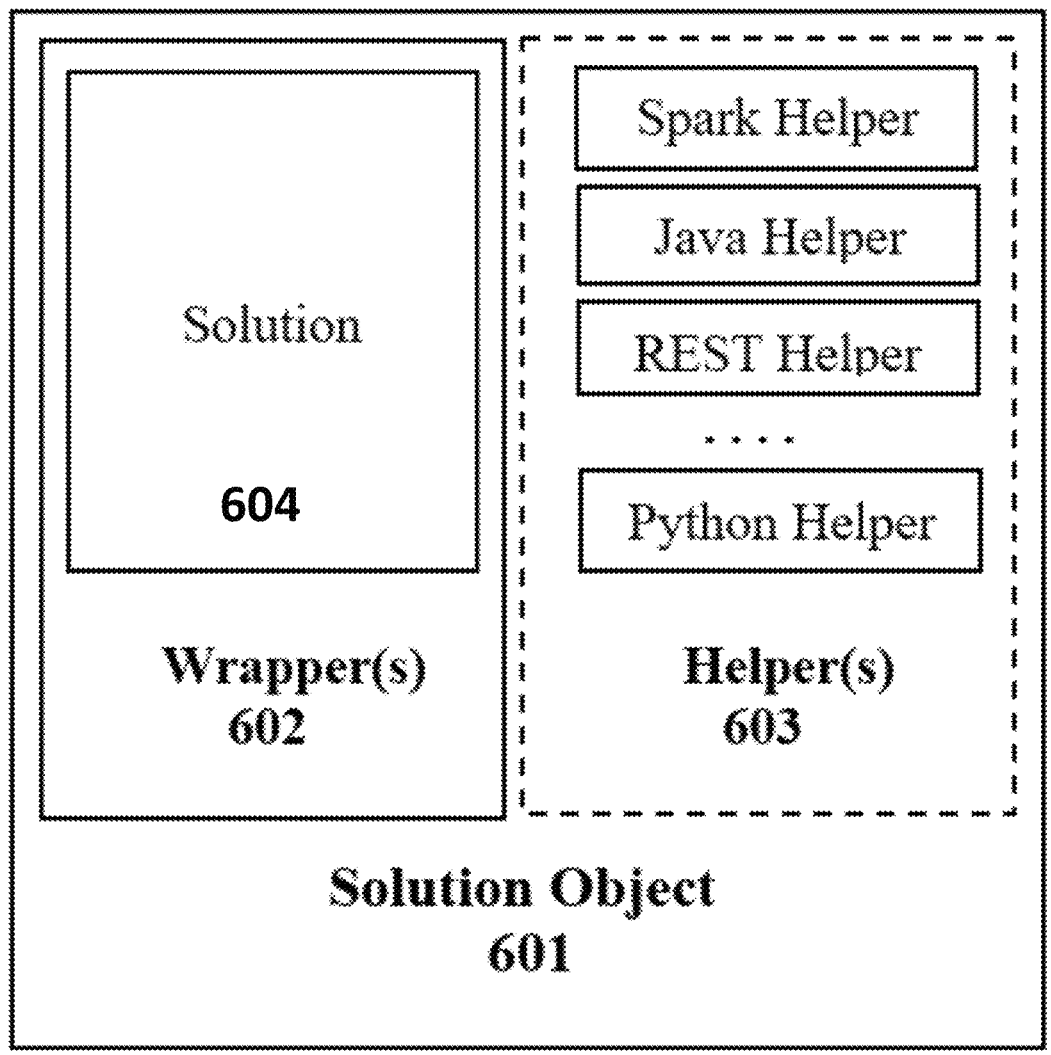
FIG. 6 illustrates a solution object according to an exemplary embodiment.

FIG. 6 illustrates a solution object according to an exemplary embodiment. As shown in FIG. 6, the solution object 601 includes the solution 604, one or more wrapper objects 602, and a plurality of helper programs 603. The solution object 601 corresponds to the deployed solution (e.g., the solution along with all the necessary programs and wrappers required for execution on a deployment platform). The deployed solution is a solution with a wrapper along with helper program code for consumption from each supported platform. The helper program determines how and where to execute the solution. As explained in greater detail below, it is configured to create the necessary environment to start and use the wrapped solution. It also has the intelligent to execute a solution locally or remotely as required.

The solution 604 and the solution code are discussed in greater detail above. The wrapper 602 wraps the solution with custom code so that the solution can be executed from any type of platform or runtime environment. It exposes the framework neutral Application Programming Interfaces (APIs), if required, and provides the helper program with a way to communicate with the solution.

As shown in FIG. 6, the solution object (deployed solution) can include a plurality of helper programs 603 (also referred to herein as "helpers"). Each helper program is configured is to create the right environment and launch the solution. Each helper program is directed to a different runtime environment and will also expose the platform specific APIs for that runtime environment to enable communication with the solution. As explained in greater detail below, each consumer of the solution will utilize the program which suites their particular environment.

Solutions are stored in a Solutions Repository ("SR") that can be accessible enterprise-wide and also to customers/clients of the enterprise on their local systems. The process for registration of solutions, creation of solution object (deployable solutions), and initial selection of solutions for deployment is described in greater detail below.

Users can register their solutions (script/code) along with the dependencies and runtime details. The SR provides plugins for various development platforms with which the user can add a solution. For example, the SR provides a Jupyter Notebook plugin, which Data Scientist can use to upload their solution by providing the solution details in a predefined template. The SR UI also provides a basic form which can be filled by customer to provide the solution details.

On registration, the Solution Repository will generate a wrapper for the solution, helper programs configured to interface with solution and with various runtime environments, and client code for consuming the solution from different languages and platforms. A deployed solution, has the intelligence to make sure that it executes from anywhere in a way which ensures the best possible performance. One of the benefits of the present is that the consumer of the solution does not have to worry about upgrades to the solution as the generated solution objects can be updated upon release of new versions. The Solution Repository and intelligent execution system uses continuous integration and continuous deployment (CI-CD) to ensure that the latest version of solutions are integrated and ready to be consumed.

The Solution Repository provides client code/plugin to use the registered solution from a variety of different platforms and runtime environments. This can include different languages like Java or Python, different frameworks or products like Informatica DEI, CDI-e, Master Data Management (MDM), Enterprise Data Catalog (EDC), and different libraries such as Spark, Pandas, or Tensorflow.

As explained in greater detail further in this disclosure, after deployment, the execution of the solution can happen locally on the deployment platform (e.g., at the consumer/client end) or can occur remotely on a remote platform (e.g., a server). Depending on the environment from which the solution is being consumed, the solution will smartly decide where and how to execute. This can include executing within an existing process that is consuming the solution, using solution APIs to communicate with the consuming process, out of process locally on the deployment platform, using Inter Process Communication (IPC) to communicate with the consuming process, out-of-process locally in a container (e.g., a Docker container), using Inter Process Communication to communicate with the consuming process, or out-of-process remotely, using HTTP request/response to communicate with the consuming process.

As explained earlier, the deployed solution (solution object) can include a plurality of different helper programs, with each helper program being configured to interface with a specific runtime environment or platform. When the solution is consumed, it is necessary to select a specific helper program from the plurality of helper programs in order to execute the solution.

Figure 7:
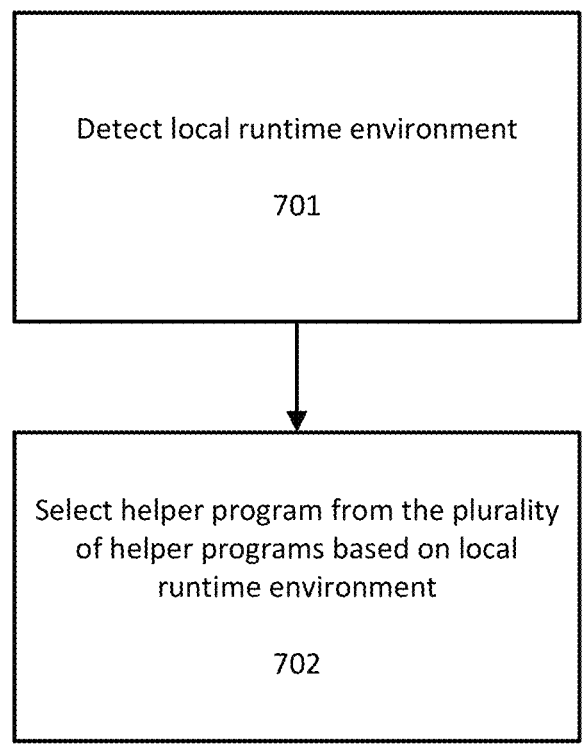
FIG. 7 illustrates a flowchart for selecting a helper program according to an exemplary embodiment.

FIG. 7 illustrates a flowchart for selecting a helper program according to an exemplary embodiment. At step 701 the local runtime environment of the process that is consuming the solution is detected. This step can be performed by client code bundled with the solution object or software native to the deployment platform. At step 702 helper program is selected from the plurality of helper programs based at least in part on the local runtime environment. For example, if the local runtime environment is a Java development environment, then a Java helper can be selected. Similarly, if Spark client code is the local runtime environment, then a Spark helper can be used. As an alternative to the process shown in FIG. 7, a user can be presented with a list of helper program options when they elect to consume solution. The user can then select whichever helper corresponds to their current environment or needs. The user can also toggle an option to have the helper intelligently selected, as shown in FIG. 7. This step can be accomplished by having the user select from different consumable APIs/plugins, each of which can be associated with a specific helper. The user can also utilize the APIs/plugins to select different execution options and configurations.

Returning to FIG. 4, at step 402 the selected helper program on the deployment platform determines whether the solution is executable on the deployment platform based at least in part on the solution language and one or more of a target language of the helper program, an availability of a runtime environment for the solution language on the deployment platform, or an availability of containerization software on the deployment platform.

If the solution is executable on the deployment platform, then at step 403 the helper program executing on the deployment platform launches the solution on the deployment platform based at least in part on a determination that the solution is executable on the deployment platform.

If the solution is not executable on the deployment platform, then at step 404 the helper program executing on the deployment platform launches the solution on a remote platform on the computer network that is configured to execute the solution based at least in part on a determination that the solution is not executable on the deployment platform.

Regardless of whether solution is launched on the deployment platform or on a remote platform, at step 405 the helper program communicates with the launched solution to enable to the launched solution to interface with the local runtime environment on the deployment platform. The helper program is configured to continuously communicate with the launched solution as the solution executes so that the output of the solution can be consumed by the deployment platform.

Figure 8:
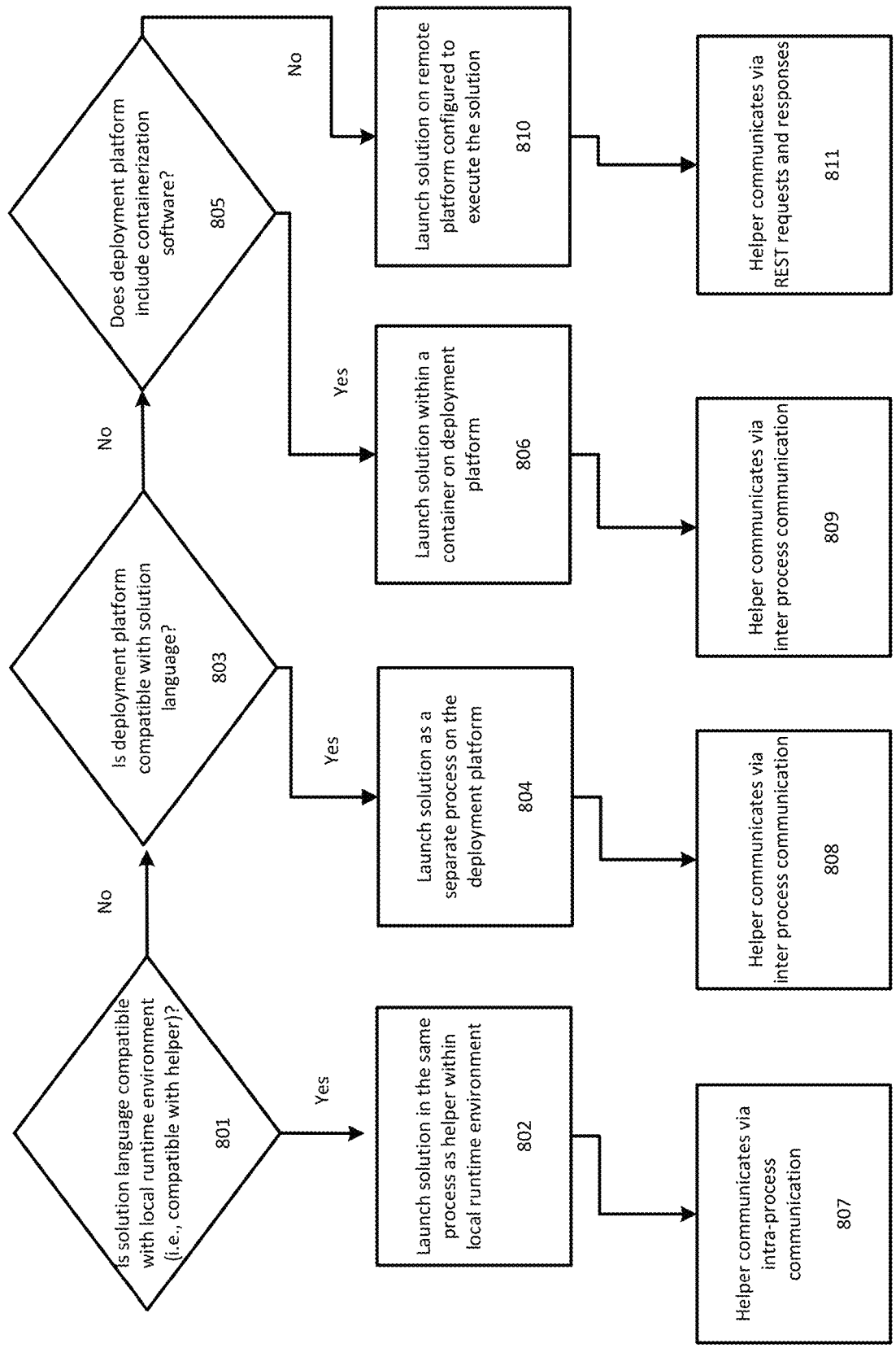
FIG. 8, which illustrates a process for determining whether the solution is executable on the deployment platform, launching the solution, and communicating with the solution according to an exemplary embodiment.
Figure 9:
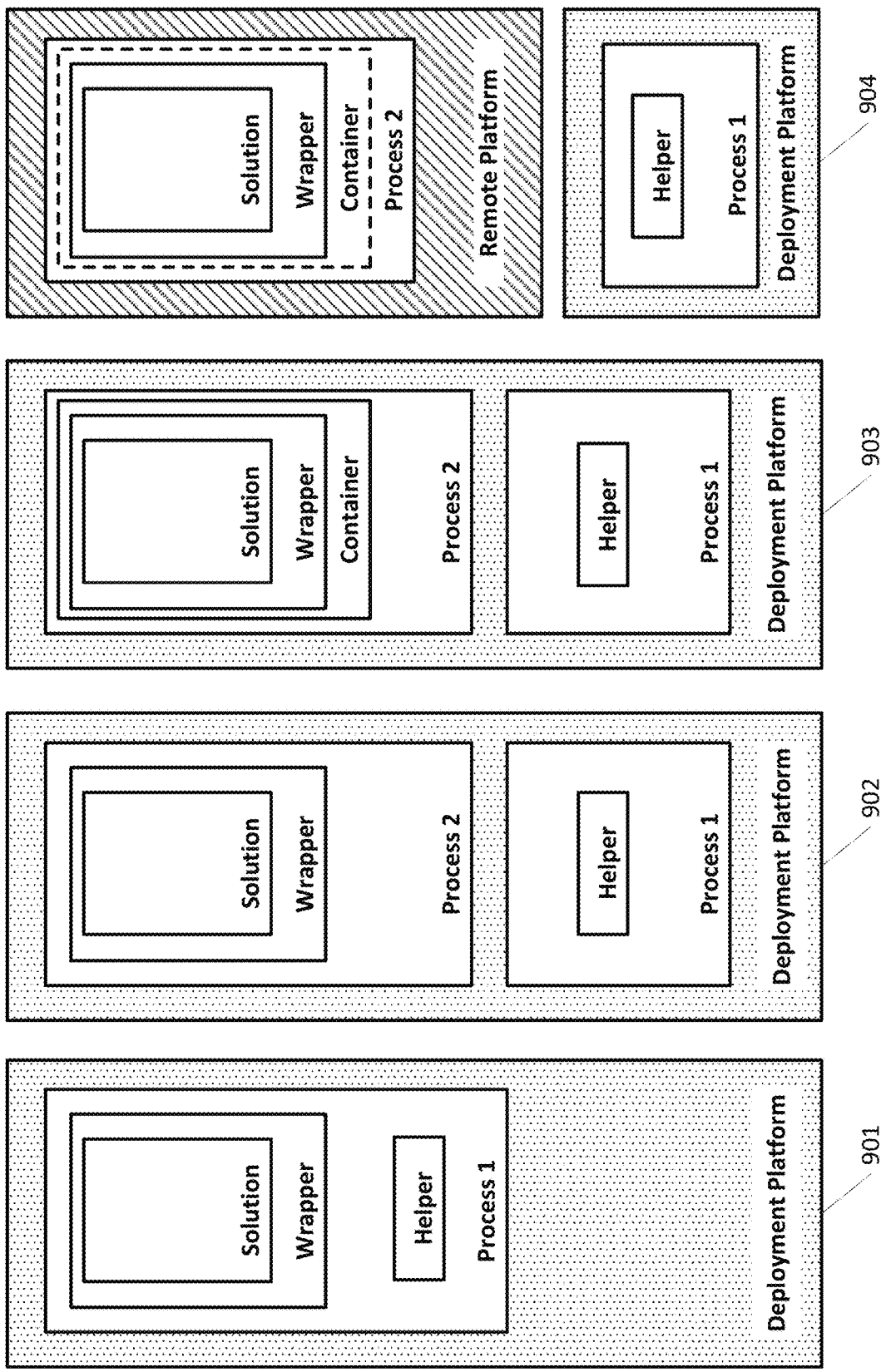
FIG. 9 illustrates examples of different deployment scenarios described in FIG. 8 according to an exemplary embodiment.

This process described in steps 402-405 is explained in greater detail with respect to FIG. 8, which illustrates a process for determining whether the solution is executable on the deployment platform, launching the solution, and communicating with the solution according to an exemplary embodiment. Additionally, FIG. 9 illustrates examples of different deployment scenarios described in FIG. 8 according to an exemplary embodiment.

As shown at step 801 of FIG. 8, determining whether the solution is executable on the deployment platform can include determining whether the solution language is compatible with the local runtime environment. Since the helper program is itself selected based upon the local runtime environment, this step can be performed by determining whether the solution language is compatible with the selected helper program. In other words, determining whether the selected helper program is directed to the runtime environment configured to execute code in the solution language.

If the solution language and the helper program are compatible and/or the solution language and local runtime environment are compatible, then they can run in the same process. In this case, at step 802 the helper program will launch the solution in the same process as the helper program within the local runtime environment. This is the fastest and most efficient way of consuming the solution. For example, if the solution is written in Java/C++, and the Java Helper is being used to consume the solution, then the solution can be launched within the same process.

At step 807 the helper program communicates with the solution via the intra-process communication through one or more wrapper objects in the solution object. This way of data communication is applicable only when the helper program and solution are running in same process and it is achieved by calling the function/APIs exposed by the solution wrapper from the helper program. The deployment scenario in which the solution is launched within the same process as the helper program is shown in box 901 of FIG. 9.

If the solution language is not compatible with the local runtime environment, then the step of determining whether the solution is executable on the deployment platform can further include determining, by the helper program, whether the deployment platform includes a runtime environment compatible with solution language, as shown in step 803. This step can include determining if the deployment platform has the desired runtime environment installed locally.

If it is determined that the deployment platform includes a runtime environment compatible with solution language, then at step 804 the helper program launches the solution as a separate process on the deployment platform. For example, if a solution is written Python and Java Helper is used (due to the runtime environment being Java and the user writing Java code), then the Java Helper can launch a separate Python process if the Python runtime environment is installed locally on the deployment platform. While this will have a slower performance than the first option, it still allows for local execution.

At step 808 the helper program communicates with the launched solution via inter process communication. TCP or HTTP protocol can be used for communication between the process executing the helper program and the process executing the launched solution. The deployment scenario in which the solution is launched within a separate process from the helper program but without containerization and on the deployment platform is shown in box 902 of FIG. 9.

If the solution language is not compatible with the local runtime environment and the deployment platform does not includes a runtime environment compatible with solution language, then the step of determining whether the solution is executable on the deployment platform can further include determining, by the helper program, whether the deployment platform includes containerization software, as shown in step 805. This can include, for example, determining whether containerization software (e.g., Docker) is available on the deployment platform and determining whether the solution object contains the container details (e.g., the Docker image) required to instantiate a container. Optionally, the solution or the Solutions Repository can be configured to not use containers, in which case this step can be skipped.

If it is determined that the deployment platform includes containerization software compatible with the solution language, then at step 806 the solution is launched within a container on the deployment platform based at least in part on a determination that the solution language is not compatible with the local runtime environment. For example, if the solution is written in Python and deployed within a Java runtime environment (utilizing a Java helper program) and Python is not installed locally, the helper program will start a container with the details provided in the solution and start the process within the solution. The performance with containerization is similar to the previous approach, but container management can result in additional processing overhead.

At step 809 the helper program communicates with the launched solution container via inter process communication. TCP or HTTP protocol can be used for communication between the process executing the helper program and the container and process executing the launched solution. The deployment scenario in which the solution is launched within a container on a different process from the helper program and on the deployment platform is shown in box 903 of FIG. 9.

If the solution language is not compatible with the local runtime environment, the deployment platform does not includes a runtime environment compatible with solution language, and containerization is not possible (either due to lack of containerization software on the deployment platform or lack of container details in the solution object), then at step 810 the helper program launches the solution on a remote platform on the computer network that is configured to execute the solution. Optionally, a user can manually indicate that they would like to execute the solution remotely, in which case no steps will be taken to determine whether the solution can be launched on the deployment platform. This step can include transmitting instructions to the remote platform to launch the solution and exposing a RESTful endpoint of the launched solution so that the helper program can communicate with the launched solution.

At step 811 the helper program helper software communicates with the launched solution via requests and responses over hypertext transfer protocol (HTTP). The deployment scenario in which the solution is launched on a different process and on a remote platform from the helper program is shown in box 904 of FIG. 9. Note that if the remote platform includes native support for the solution language and run-time environment, then a container (shown in dashed lines) on the remote platform may not be required.

While the performance of remote execution can be slow and resource-intensive as compared to the above-mentioned local execution methods, remote execution can be well suited for certain use-cases. For example, if the client using the solution has limited resources (RAM/CPU) and data can be processed externally with better hardware, then remote execution can result in a net gain in processing time, even with the additional network communication required.

FIGS. 10A-10D illustrate several example deployment scenarios for solutions in different runtime environments according to an exemplary embodiment. Each of these deployment scenarios are discussed in greater detail below.

Figure 10A:
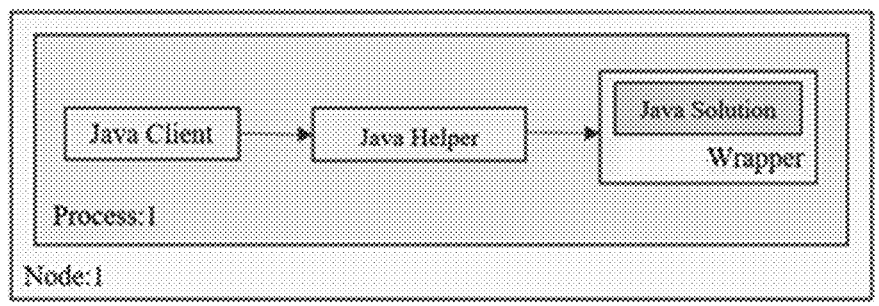
FIGS. 10A-10D illustrate several example deployment scenarios for solutions in different runtime environments according to an exemplary embodiment.

FIG. 10A illustrates a Java client using a solution written in Java. As shown in the figure, a Java Helper program that is present in the deployed solution is utilized to launch the solution. The Java Helper determines that the solution it is referring to is written in Java of same version, so it loads the solution classes locally. The data will then be processed locally (on Node 1) and will yield better performance.

Figure 10B:
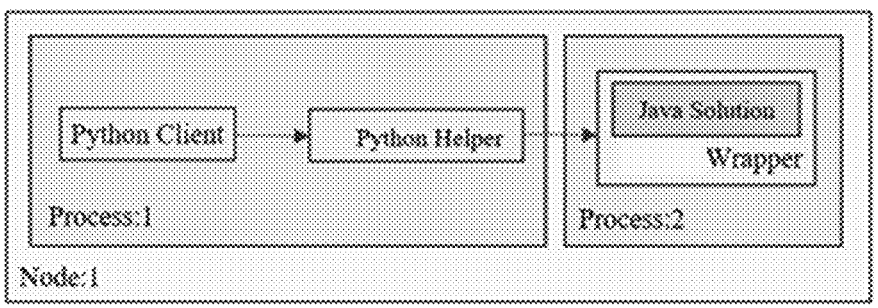

FIG. 10B illustrates a Python client using a solution written in Java. In this example, When the deployed solution is used from a Python program, Python Helper will be used and determines that the required version of Java is installed locally. The helper will then launch the solution as a separate process and use it for processing the data provided by Python program.

Figure 10C:
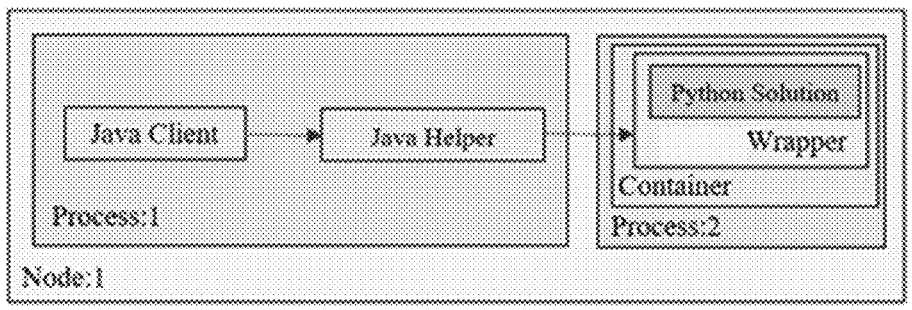

FIG. 10C illustrates a Java client using a solution written in Python with local execution. When a Java client wants to use a deployed solution written in Python, the Java Helper determines that Python is not installed locally, and determines whether it is possible to launch container locally. When it determines that a container can be launched, it will start the container and start the solution in that container. It will then process the data using the launched solution and clean up once processing is complete.

Figure 10D:
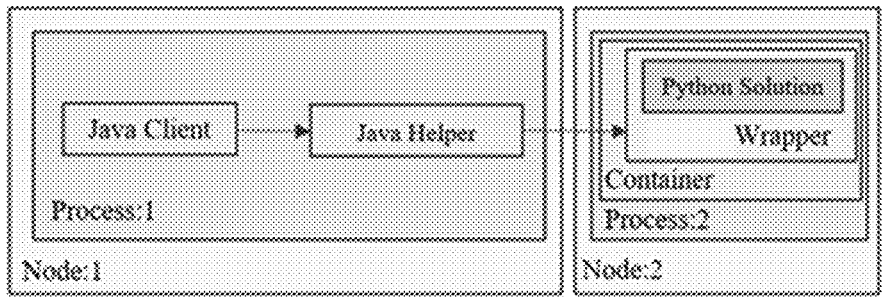

FIG. 10D illustrates a Java Client using a solution written in Python with remote execution. If launching the process locally is not possible with or without using container for the above-mentioned use case, the Java Helper will launch a REST endpoint in the Solutions Repository, and will start processing the data using REST requests and responses. After processing all the data, it will clean the REST endpoint.

Figure 11:
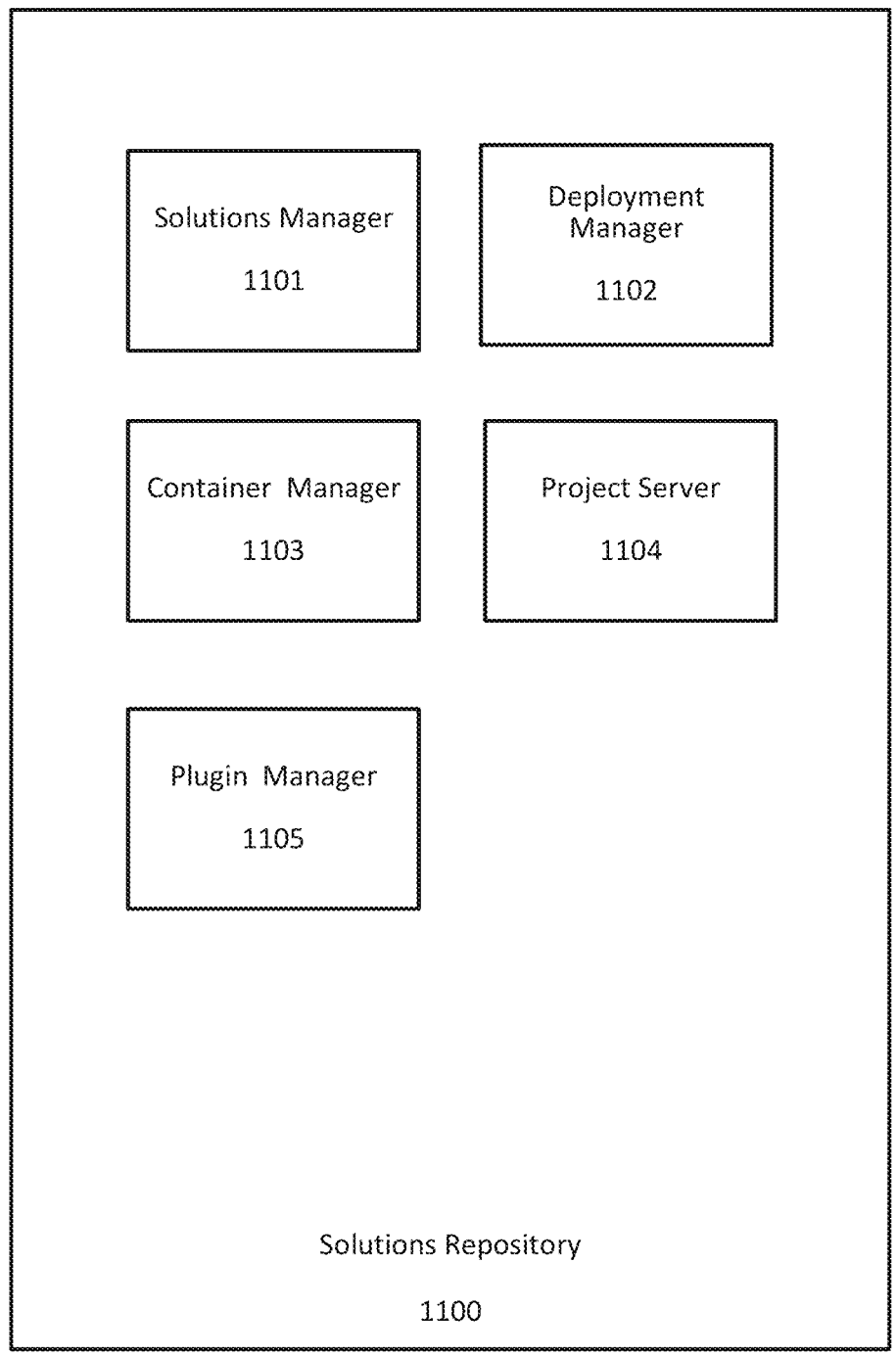
FIG. 11 illustrates different components of the Solutions Repository according to an exemplary embodiment.

FIG. 11 illustrates different components of the Solutions Repository according to an exemplary embodiment. Each of these components of the Solutions Repository 1100 are described in greater detail below. The Solutions Repository is a repository of solutions, deployed solutions and runtimes (images/containers) details. It provides a way to manage (add/update/delete) solutions and runtime details. It also performs the resource intensive tasks generating the wrapper and helper codes so that added solutions can be used from anywhere.

The Solutions Manager 1101 provides a way to manage solutions in the Solutions Repository 1100. It provides REST APIs to add, update and delete solutions, deployed solutions and containers. It also shows consumption details to assist users in consuming the deployed solutions. For example, the Solutions Manager 1101 can display a menu of possible consumption options (corresponding to different runtime environments) that can be used to launch a particular deployed solution. This menu can include different icons/indicators corresponding to different runtime environments. The user can then select one or utilize the intelligent execution functionality to have the system select an appropriate deployment.

The Solutions Manager 1101 and Solutions Repository provides ways to add/update/delete a solution and runtime details easily by exposing REST APIs and implementing the plugins for various tools from which the solutions can be added. For example, a plugin for Jupyter Notebook can be provided so that Data Scientists can manage solutions from their workspace. An option to add a runtime details can be provided separately so that multiple solutions can use same runtime. These runtimes can then be associated with multiple solutions. Solutions can be imported and exported using the Solutions Repository so that they can be shared between different systems. The Solutions Manager 1101 can also be configured to capture any modifications of a particular solution so that the latest version of a solution is always deployed.

The Deployment Manager 1102 does the heavy lifting of generating wrapper and helper programs for each solution. It also generates example clients, which a user can just download or copy-paste and use. The Deployment Manager 1102 is configured to deploy any added solutions so that they can be consumed from different environments. It can also auto-deploy any revised or updated solutions by detecting changes in the solution code in subsequent submissions and then deploying the latest version. This insures that CI-CD is achieved. Users can also have the option of using older versions.

The Container Manager 1103 is configured to launch and clean up containers as required and determined by helper program or suggested by users. It manages the life cycle of containers locally.

The Project Server 1104 provides an option to serve the Solutions Repository remotely. It starts the solution in containers and exposes REST endpoints, if required. Creation of the REST endpoint can be triggered manually or can be started automatically when required by helper programs. It also provides a way to use other serving platforms. For example, it can start the solution in other serving platforms/runtime environments like Tensorflow serving, Seldon core etc. This offers better performance and throughput along with other features offered by other serving platform.

The Plugin Manager 1105 exposes APIs and interfaces to implement plugins for adding solutions from users and/or customer/partner products and implements plugins for consuming deployed solution from partner/customer products. Partners can add a custom plugin so that the registered solution can be consumed directly from their product.

Figure 12:
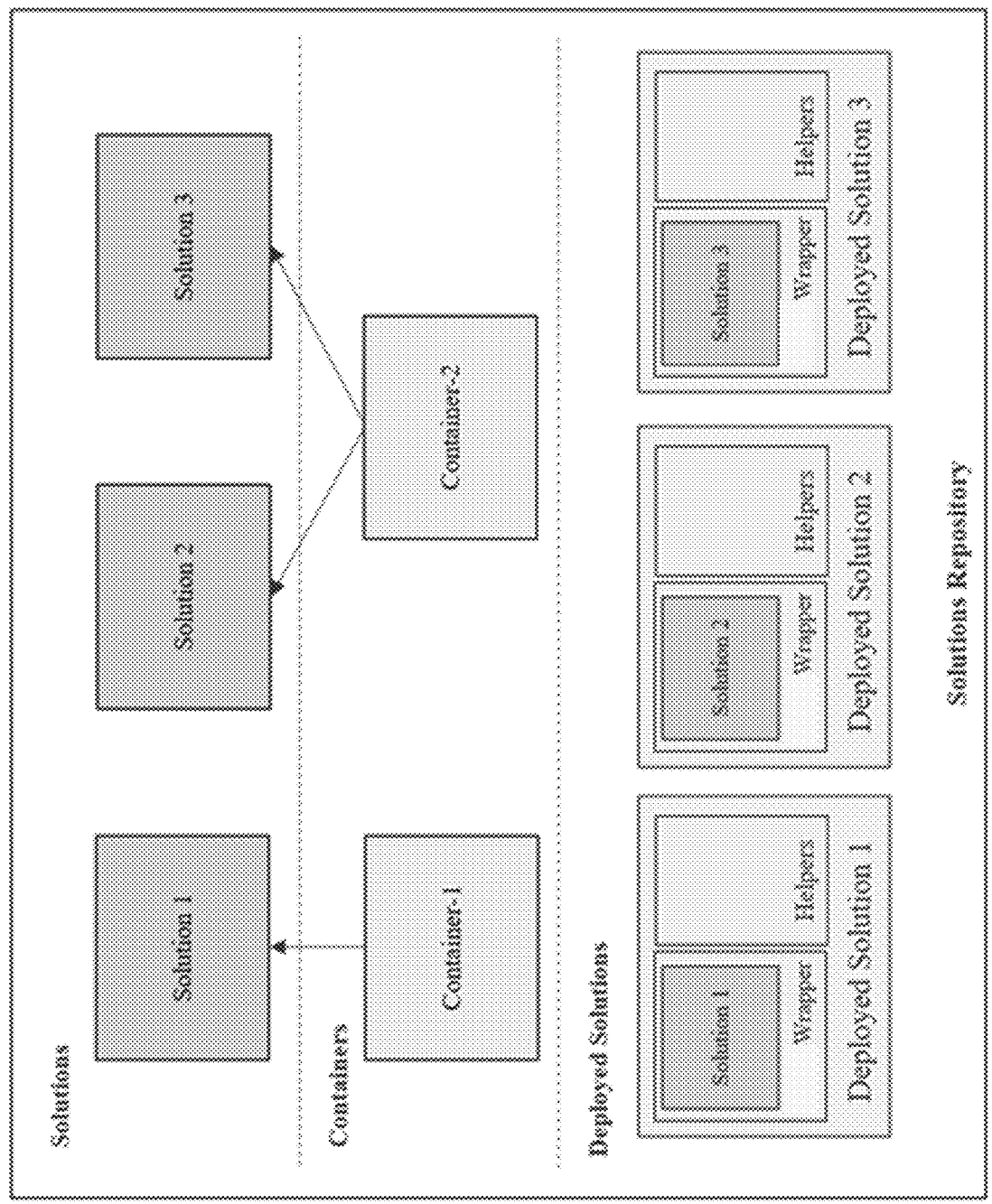
FIG. 12 illustrates the different entities (solution, containers, deployed solutions) managed by the solutions repository and their associations according to an exemplary embodiment.

FIG. 12 illustrates the different entities (solution, containers, deployed solutions) managed by the solutions repository and their associations according to an exemplary embodiment. As shown in the figure, the various components of the solutions repository can store and/or manage multiple solutions, multiple containers, and multiple deployed solutions and can make determinations regarding how to deploy containers and solutions. For example, as shown in FIG. 12, the deployment manager can determine that Solution 2 and Solution 3 can be launched within a single container (Container 2).

Figure 13:
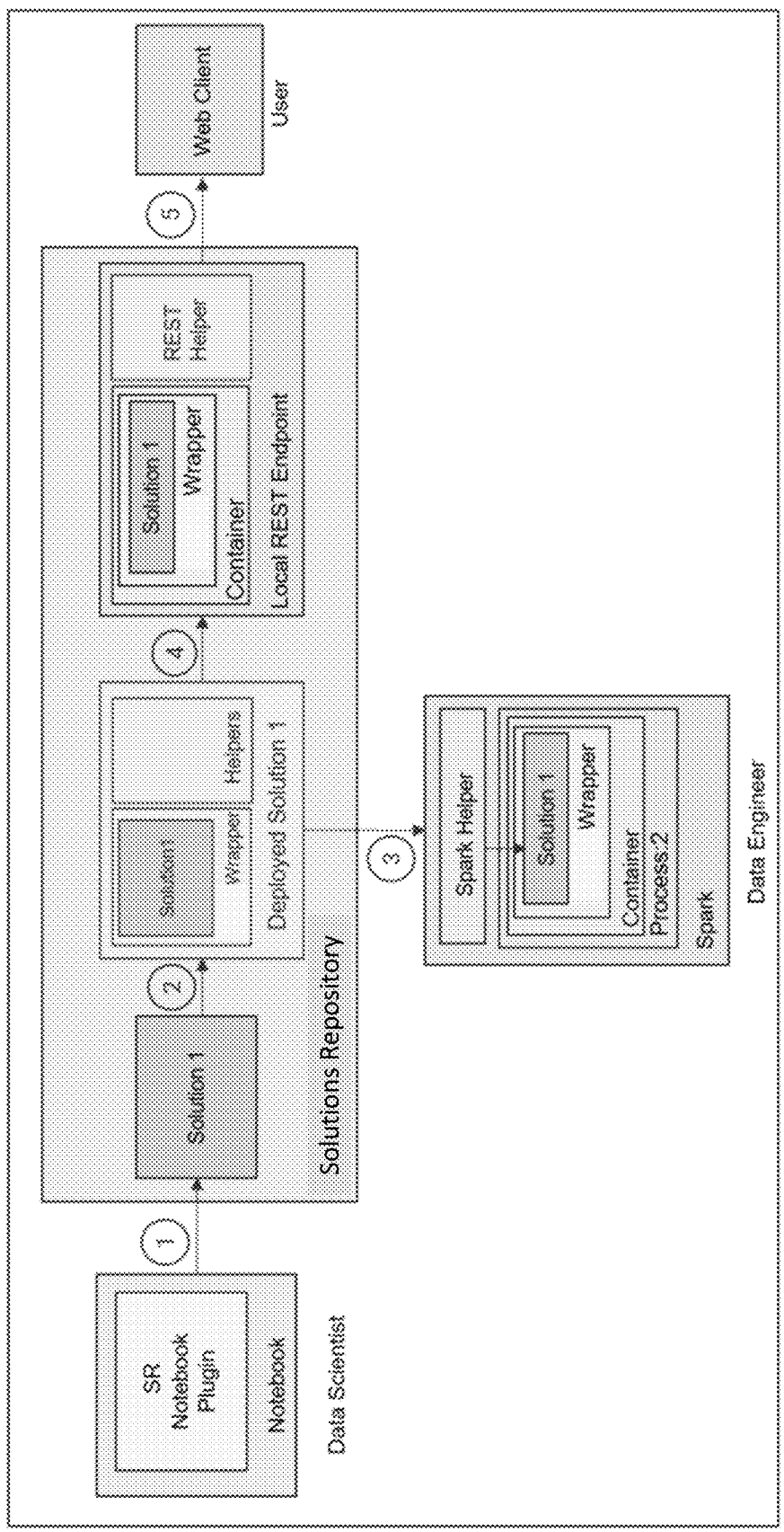
FIG. 13 illustrates an example of how solutions are added, deployed and consumed buy different teams according to an exemplary embodiment.

FIG. 13 illustrates an example of how solutions are added, deployed and consumed buy different teams according to an exemplary embodiment. The operation of the Solutions Repository in FIG. 13 is explained by the following steps:

Step 1: User can download and use the SR plugin to add the solution to SR from their preferred tool. In the FIG. 15, a Data Scientist add a solution to ISR by using the ISR plugin for Notebook.

Step 2: The SR then deploys the solution and creates all the necessary wrappers and helpers.

Step 3: A consumer of the solution can download the deployed solution with specific helper and start using it locally. In FIG. 13, a data engineer downloads the Spark Helper with the deployed solution and uses it with a Spark Job.

Step 4: The user can indicate that they would like to start serving the Deployed Solution, which will create the REST endpoints to use the solution.

Step 5: A web client can then connect to the solution being served via HTTP requests and responses.

Figure 14:
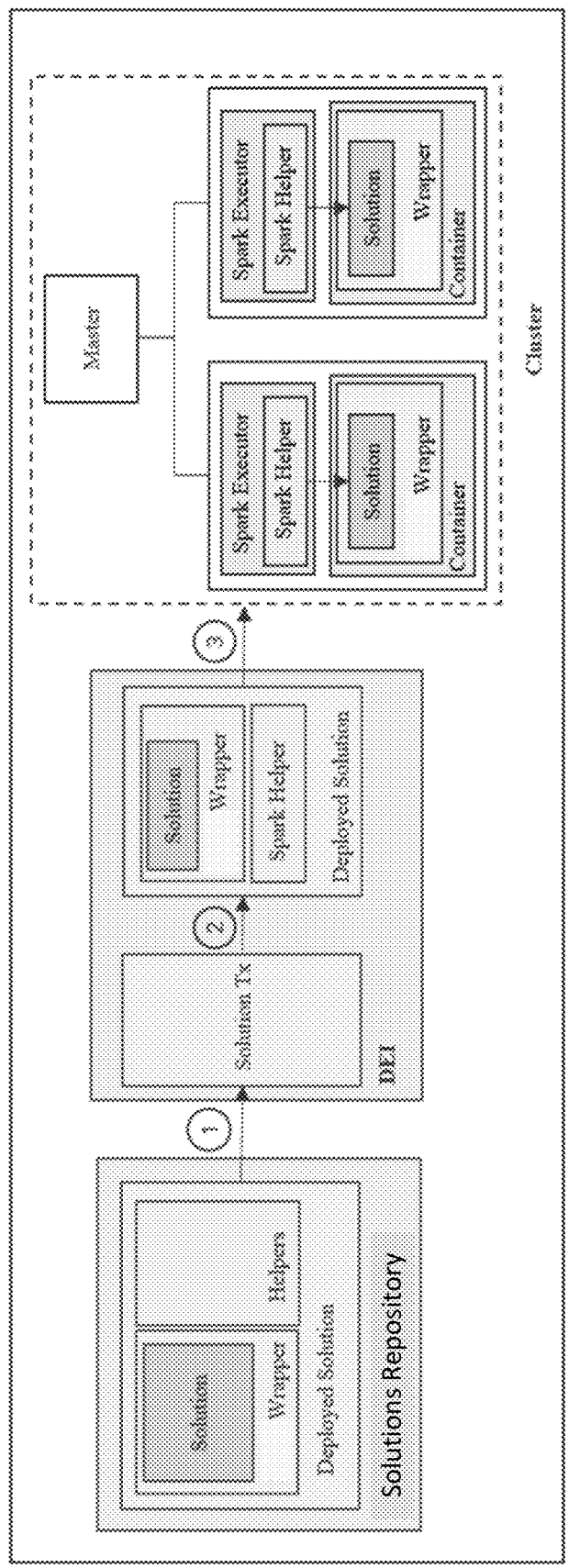
FIG. 14 illustrates an example of consuming a solution using a Solutions Repository DEI plugin according to an exemplary embodiment.

FIG. 14 illustrates an example of consuming a solution using a Solutions Repository DEI plugin according to an exemplary embodiment. A transformation plugin for data engineering integration, referred to herein as "Solution Tx" can act as an SR plugin and allow users to use the solutions deployed in the SR. Solution Tx connects to the SR and shows a list of all the deployed solution. The user can simply select one of the solutions and use it to run a mapping. FIG. 14 shows the steps used to consume a solution present in the SR using Solution Tx, which executes the solution on top of Spark on a Hadoop Cluster. These include Step 1: Creating a new transformation "Solution Tx" in a mapping and selecting the desired deployed solution.

Step 2: Downloading, with Solution Tx, the Deployed Solution with a Spark Helper.

Step 3: Using the downloaded solution binaries and creating a Spark job using it. The Spark job then transfers the binaries to the cluster. Spark executors uses the Spark Helper to launch a new container locally in each cluster node and start the solution within the container.

Similarly, plugins for other products can be developed, so that users do not have to invest much time in collaborating the solution into their products. The plugin can also take care of making sure that the latest version of the solution is being used, thereby enforcing CI-CD.

Figures 1A, 1B:
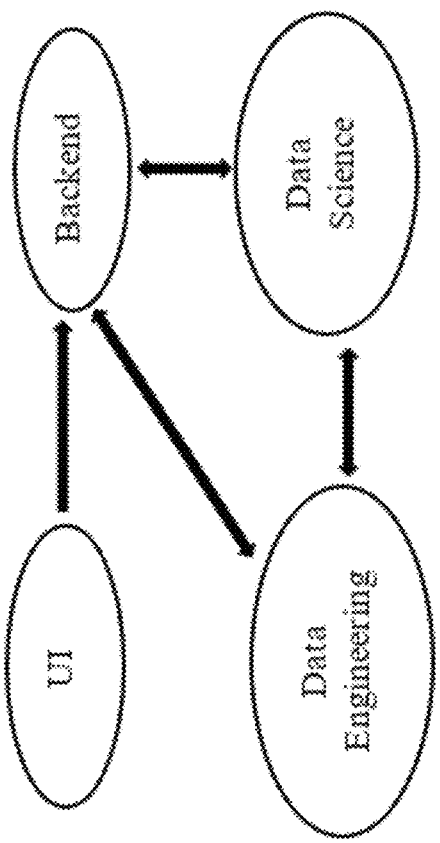
Figure 15:
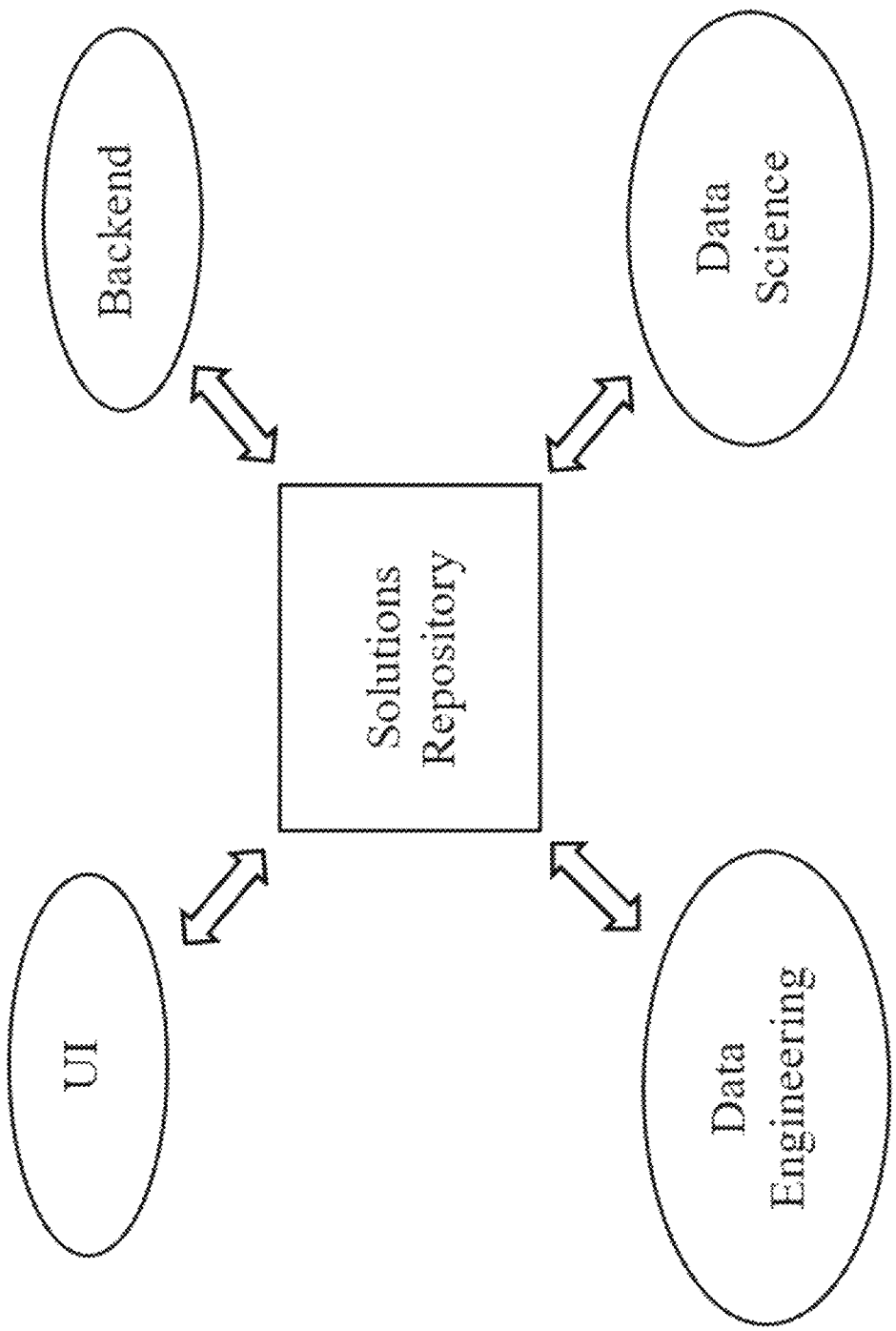
FIG. 15 illustrates how the Solutions Repository allows for solutions to be delivered to different teams within an enterprise.

FIG. 15 illustrates how the Solutions Repository allows for solutions to be delivered to different teams within an enterprise. Unlike the data flow shown in FIG. 1B, the Solutions Repository allows for all teams to both submit and consume different solutions having different runtime environments and solution languages.

Figure 16:
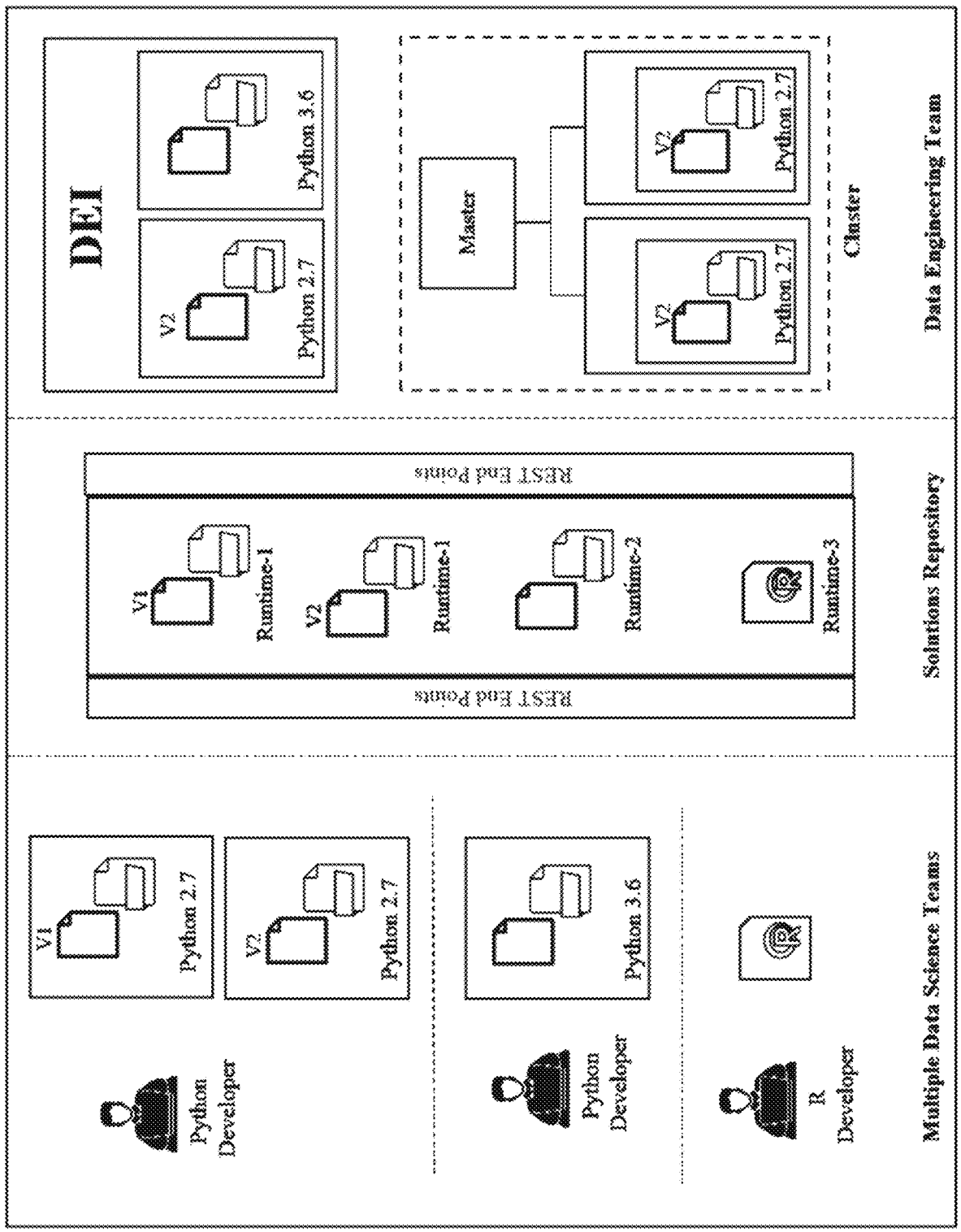
FIG. 16 illustrates how the present system solves the specific use-case problem shown in FIG. 2.

FIG. 16 illustrates how the present system solves the specific use-case problem shown in FIG. 2. Using the SR, data scientists can add their custom solution from language and framework of their choice, along with runtime details and other metadata. The SR will do the heavy lifting of generating the necessary integration code and artifacts for DEI, Spark framework and Scala language. A data Engineer can then just select the added solution from a dropdown and use it in the ETL process locally. CI-CD is inbuilt. The data scientist can keep updating the solution with latest version of solution. The data engineer can then use the latest or a previous version of the solution. In this way, the data scientist can share different versions of his/her solution and the data engineer can use the required version without much collaboration and minimum downtime, improving the efficiency of the integration.

Figure 17:
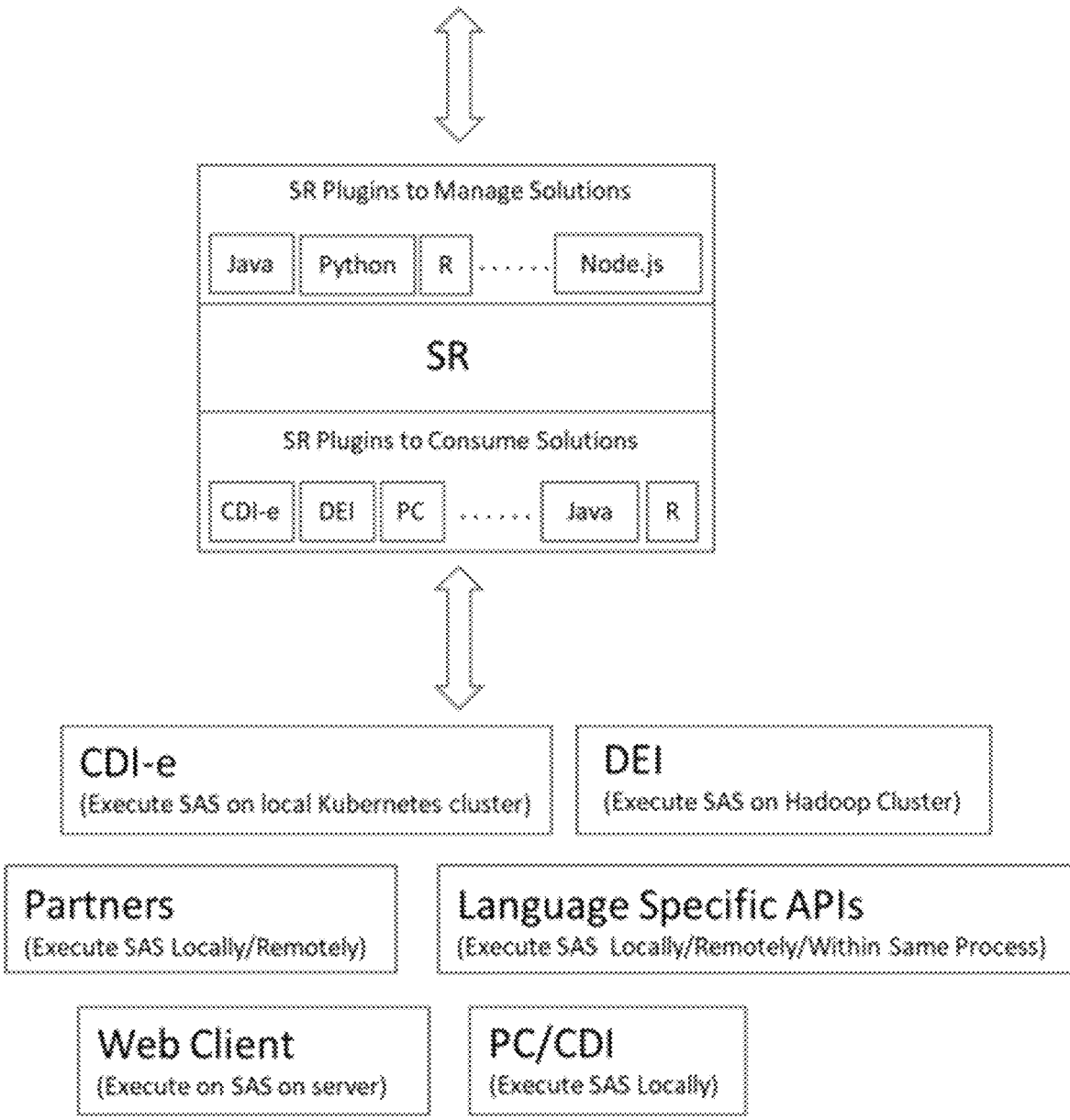
FIG. 17 illustrates how the SR is able to address all the challenges shown in FIG. 3 previously.

FIG. 17 illustrates how the SR is able to address all the challenges shown in FIG. 3 previously. It shows how the SR does the makes solution available for different consumption options through the generation of plugins for managing and consuming solutions. On the management side, the plugins allow users to provide code and dependencies. On the consumption side, the plugins allow users to browse, select, and use various solutions and to download SR binaries if required.

FIG. 17 shows how the SR framework can be extended with the help of various plugins. With the help of these plugins eventually customers will be able to write/develop once and consume solutions from anywhere. This enables more efficient sharing of solutions within an organization and between different teams and reduces the collaboration time for integration of a solution.

The SR provides a framework to share solutions, minimizes collaboration time, makes solutions reusable from different platforms, provides solution lifecycle management, conceals underlying complexity from the user, and provides a single API to execute remotely or locally, and on a cluster.

The present systems offers many benefits over prior systems. One benefit of using the SR is that any solution can be executed from anywhere (supported language, framework, libraries). Consumers of the solution can use it just like any other API call from their environment, or very easily from a provided plugin of their product, and do not have to worry about setting up their environment. After complete support for all the languages/platforms we can say by using SR users can write from anywhere and execute from anywhere. Additional benefits are described below.

Minimum Collaboration

The creator of the solution and consumer of the solution have to spend minimum to no time in collaboration, and so they do not have to learn about technologies being used by each other.

Easy Integration of Work

Since the example client is also generated to consume the solution, consumer can quickly download or copy-paste and test if a solution works in the right way. SR plugins for various tools and platforms will further ease the integration of projects from different teams.

Versioning

Each Solution is versioned, so at any specific point in time, a user can select a specific version, deploy it, and consume it.

CI-CD with minimum to zero downtime

Any changes in the solution result in the updated solution being automatically deployed and ready to be consumed. Deployed Solutions running in production have the option to automatically use the latest version, whereas binaries will be automatically downloaded by Helpers or Plugins to use the latest version with no downtime.

Decoupling of Work

The SR can be used to integrate the projects within same team, so each project can be worked on in a completely decoupled way, and the SR can be used to integrate the projects intelligently, like executing projects in the same process or same node or remotely in different nodes if required.

Plugins for Partner Products

Plugins can be developed to add or consume solutions directly from partner's products. Using these plugins, customers on partner's products will be able to integrate and use solution services and platforms very easily.

Better Performance

By smartly selecting the way solution will be executed, the SR and helpers improve performance in data processing time for the selected solution and minimize the network traffic on the computer network required to execute a particular solution.

Central Place to Manage and Monitor Solution

Various statistics about the solutions can be collected like throughput, latency, total number of consumers, usage details etc. Based on these stats the creators and consumers of the solution can make important decisions on which solution to use and how to use solutions.

Faster Overall Completion of Projects and Upgrades

With minimum collaboration, ready to use clients, and auto CI-CD with no downtime customers can drastically reduce the overall project completion times.

Figure 18:
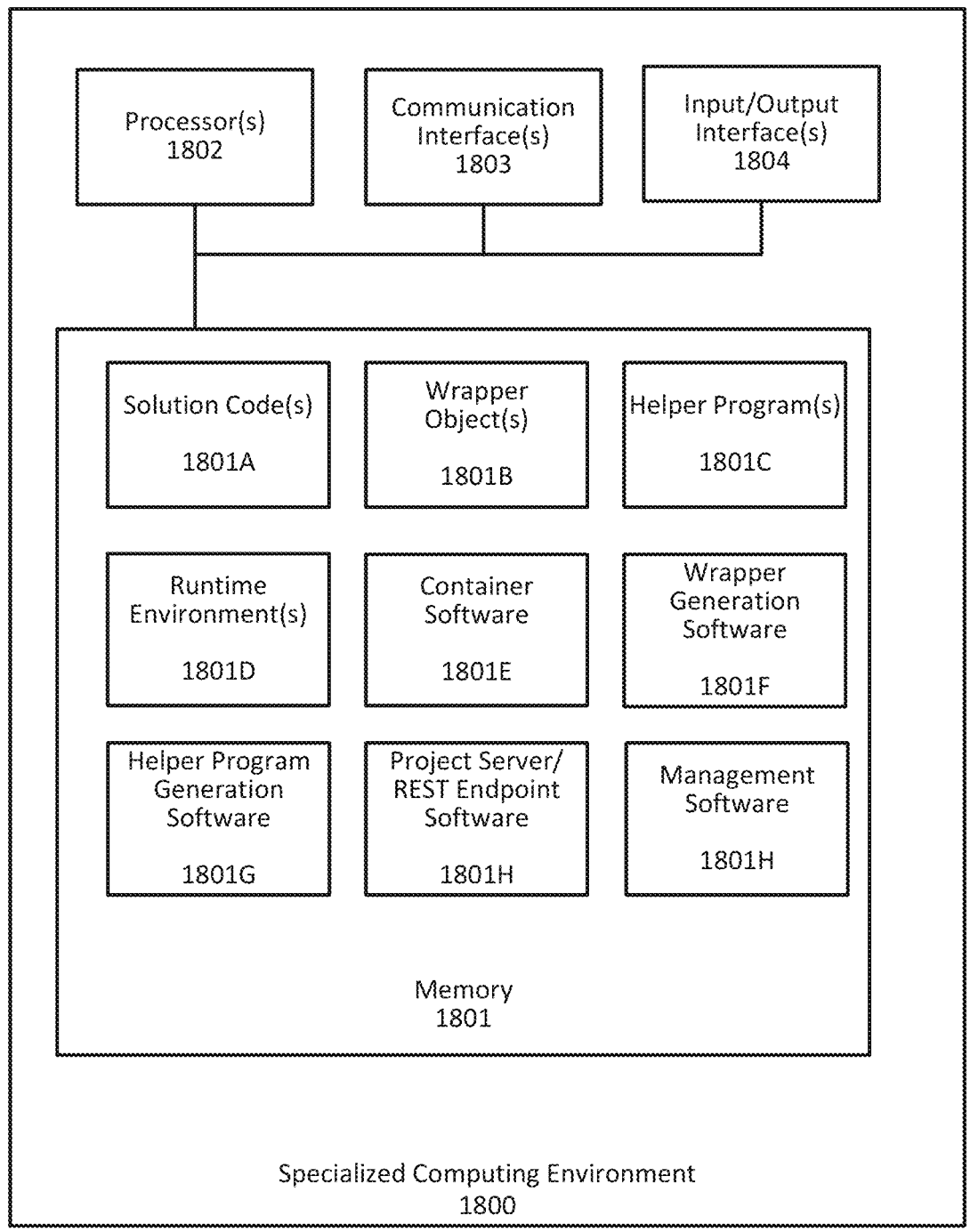
FIG. 18 illustrates the components of the specialized computing environment for intelligent execution of a solution on a computer network.

FIG. 18 illustrates the components of the specialized computing environment 1800 configured to perform the processes described herein. Specialized computing environment 1800 is a computing device that includes a memory 1801 that is a non-transitory computer-readable medium and can be volatile memory (e.g., registers, cache, RAM), non-volatile memory (e.g., ROM, EEPROM, flash memory, etc.), or some combination of the two.

As shown in FIG. 18, memory 1801 can include solution code(s) 1801A, wrapper object(s) 1801B, helper programs 1801C, runtime environments 1801D, container software 1801E, wrapper generation software 1801F, helper program generation software 1801G, project server/REST endpoint setup software, and management software (1801H), including software to manage solutions, deployments, etc.

Each of the program and software components in memory 1801 store specialized instructions and data structures configured to perform the corresponding functionality and techniques described herein. For example, helper program(s) 1801C include the intelligent execution logic described earlier that is used to determine where and how to execute a particular solution.

All of the software stored within memory 1801 can be stored as a computer-readable instructions, that when executed by one or more processors 902, cause the processors to perform the functionality described with respect to FIGS. 4-17.

Processor(s) 1802 execute computer-executable instructions and can be a real or virtual processors. In a multi-processing system, multiple processors or multicore processors can be used to execute computer-executable instructions to increase processing power and/or to execute certain software in parallel.

Specialized computing environment 1800 additionally includes a communication interface 1803, such as a network interface, which is used to communicate with devices, applications, or processes on a computer network or computing system, collect data from devices on a network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 1800 further includes input and output interfaces 1804 that allow users (such as system administrators) to provide input to the system to display information, to edit data stored in memory 1801, or to perform other administrative functions.

An interconnection mechanism (shown as a solid line in FIG. 18), such as a bus, controller, or network interconnects the components of the specialized computing environment 1800.

Input and output interfaces 1804 can be coupled to input and output devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 1800.

Specialized computing environment 1800 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 1800.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

What is claimed is:

1. A method executed by one or more computing devices of a deployment platform for intelligent execution of a solution on a computer network, the method comprising:

receiving, by the deployment platform, an instruction to execute a solution in a local runtime environment on the deployment platform, the solution comprising solution code written in a solution language;

determining, by a helper program on the deployment platform, whether the solution is executable on the deployment platform by:

determining whether the solution language is compatible with the local runtime environment;

determining whether the deployment platform includes a runtime environment compatible with solution language based at least in part on a determination that the solution language is not compatible with the local runtime environment; and determining whether the deployment platform comprises containerization software compatible with the solution language based at least in part on a determination that the solution language is not compatible with the local runtime environment and a determination that the deployment platform does not include a runtime environment compatible with solution language; and launching, by the helper program on the deployment platform, the solution by either:
  launching the solution on the deployment platform based at least in part on a determination that the solution is executable on the deployment platform; or
  launching the solution on a remote platform on the computer network that is configured to execute the solution based at least in part on a determination that the solution is not executable on the deployment platform;
wherein the helper program is configured to communicate with the launched solution to enable the launched solution to interface with the local runtime environment on the deployment platform.

2. The method of claim 1, wherein the solution is part of a solution object and wherein the solution object further comprises one or more wrapper objects, the one or more wrapper objects exposing the solution to the helper program.

3. The method of claim 1, wherein the solution is part of a solution object and wherein the solution object comprises a plurality of helper programs, each helper program being directed to a different runtime environment, and further comprising:
  selecting the helper program from the plurality of helper programs based at least in part on the local runtime environment.

4. The method of claim 1, wherein the solution is part of a solution object and wherein launching the solution on the deployment platform based at least in part on a determination that the solution is executable on the deployment platform comprises:
  launching the solution within the local runtime environment based at least in part on a determination that the solution language is compatible with the local runtime environment, wherein the helper program communicates with the launched solution via intra-process communication through one or more wrapper objects within the solution object.

5. The method of claim 1, wherein launching the solution on the deployment platform based at least in part on a determination that the solution is executable on the deployment platform comprises:
  launching the solution as a separate process on the deployment platform based at least in part on a determination that that the solution language is not compatible with the local runtime environment and a determination that the deployment platform includes a runtime environment compatible with solution language, wherein the helper program communicates with the launched solution via inter process communication.

6. The method of claim 1, wherein launching the solution on the deployment platform based at least in part on a determination that the solution is executable on the deployment platform comprises:
  launching the solution within a container on the deployment platform based at least in part on a determination that that the solution language is not compatible with the local runtime environment, a determination that the deployment platform does not include a runtime environment compatible with solution language, and a determination that the deployment platform comprises containerization software compatible with the solution language, wherein the helper program communicates with the launched solution via inter process communication.

7. The method of claim 1, wherein launching the solution on a remote platform on the computer network that is configured to execute the solution based at least in part on a determination that the solution is not executable on the deployment platform comprises:
  transmitting instructions to the remote platform to launch the solution; and
  exposing a RESTful endpoint of the launched solution;
  wherein the helper program communicates with the launched solution via requests and responses over hypertext transfer protocol (HTTP).

8. A deployment platform for intelligent execution of a solution on a computer network, the deployment platform comprising:
  one or more processors; and
  one or more memories operatively coupled to at least one of the one or more processors and having instructions stored thereon that, when executed by at least one of the one or more processors, cause at least one of the one or more processors to:
    receive an instruction to execute a solution in a local runtime environment on the deployment platform, the solution comprising solution code written in a solution language;
    determine, by a helper program on the deployment platform, whether the solution is executable on the deployment platform by:
      determining whether the solution language is compatible with the local runtime environment;
      determining whether the deployment platform includes a runtime environment compatible with solution language based at least in part on a determination that the solution language is not compatible with the local runtime environment; and
      determining whether the deployment platform comprises containerization software compatible with the solution language based at least in part on a determination that the solution language is not compatible with the local runtime environment and a determination that the deployment platform does not include a runtime environment compatible with solution language; and
    launch, by the helper program on the deployment platform, the solution by either:
      launching the solution on the deployment platform based at least in part on a determination that the solution is executable on the deployment platform; or
      launching the solution on a remote platform on the computer network that is configured to execute the solution based at least in part on a determination that the solution is not executable on the deployment platform;
    wherein the helper program is configured to communicate with the launched solution to enable the launched solution to interface with the local runtime environment on the deployment platform.

9. The deployment platform of claim 8, wherein the solution is part of a solution object and wherein the solution object comprises a plurality of helper programs, each helper program being directed to a different runtime environment and wherein at least one of the one or more memories has further instructions stored thereon that, when executed by at least one of the one or more processors, cause at least one of the one or more processors to:

select the helper program from the plurality of helper programs based at least in part on the local runtime environment.

10. The deployment platform of claim 8, wherein the solution is part of a solution object and wherein the instructions that, when executed by at least one of the one or more processors, cause at least one of the one or more processors to launch the solution on the deployment platform based at least in part on a determination that the solution is executable on the deployment platform further cause at least one of the one or more processors to perform one of:

launch the solution within the local runtime environment based at least in part on a determination that the solution language is compatible with the local runtime environment, wherein the helper program communicates with the launched solution via intra-process communication through one or more wrapper objects within the solution object;

launch the solution as a separate process on the deployment platform based at least in part on a determination that that the solution language is not compatible with the local runtime environment and a determination that the deployment platform includes a runtime environment compatible with solution language, wherein the helper program communicates with the launched solution via inter process communication; or launch the solution within a container on the deployment platform based at least in part on a determination that that the solution language is not compatible with the local runtime environment, a determination that the deployment platform does not include a runtime environment compatible with solution language, and a determination that the deployment platform comprises containerization software compatible with the solution language, wherein the helper program communicates with the launched solution via inter process communication.

11. The deployment platform of claim 8, wherein the instructions that, when executed by at least one of the one or more processors, cause at least one of the one or more processors to launch the solution on a remote platform configured to execute the solution further cause at least one of the one or more processors to:

transmit instructions to the remote platform to launch the solution; and expose a RESTful endpoint of the launched solution;

wherein the helper program communicates with the launched solution via requests and responses over hypertext transfer protocol (HTTP).

12. At least one non-transitory computer-readable medium storing computer-readable instructions for intelligent execution of a solution on a computer network that, when executed by one or more computing devices of a deployment platform, cause the deployment platform to:

receive an instruction to execute a solution in a local runtime environment on the deployment platform, the solution comprising solution code written in a solution language;

determine, by a helper program on the deployment platform, whether the solution is executable on the deployment platform by:

determining whether the solution language is compatible with the local runtime environment;

determining whether the deployment platform includes a runtime environment compatible with solution language based at least in part on a determination that the solution language is not compatible with the local runtime environment; and determining whether the deployment platform comprises containerization software compatible with the solution language based at least in part on a determination that the solution language is not compatible with the local runtime environment and a determination that the deployment platform does not include a runtime environment compatible with solution language; and launch, by the helper program on the deployment platform, the solution by either:

launching the solution on the deployment platform based at least in part on a determination that the solution is executable on the deployment platform; or launching the solution on a remote platform on the computer network that is configured to execute the solution based at least in part on a determination that the solution is not executable on the deployment platform;

wherein the helper program is configured to communicate with the launched solution to enable the launched solution to interface with the local runtime environment on the deployment platform.

13. The at least one non-transitory computer-readable medium of claim 12, wherein the solution is part of a solution object and wherein the solution object comprises a plurality of helper programs, each helper program being directed to a different runtime environment and further storing computer-readable instructions that, when executed by at least one of the one or more computing devices, cause at least one of the one or more computing devices to:

select the helper program from the plurality of helper programs based at least in part on the local runtime environment.

14. The at least one non-transitory computer-readable medium of claim 12, wherein the solution is part of a solution object and wherein the instructions that, when executed by at least one of the one or more computing devices, cause at least one of the one or more computing devices to launch the solution on the deployment platform based at least in part on a determination that the solution is executable on the deployment platform further cause at least one of the one or more computing devices to perform one of:

launch the solution within the local runtime environment based at least in part on a determination that the solution language is compatible with the local runtime environment, wherein the helper program communicates with the launched solution via intra-process communication through one or more wrapper objects within the solution object;

launch the solution as a separate process on the deployment platform based at least in part on a determination that that the solution language is not compatible with the local runtime environment and a determination that the deployment platform includes a runtime environment compatible with solution language, wherein the helper program communicates with the launched solution via inter process communication; or launch the solution within a container on the deployment platform based at least in part on a determination that that the solution language is not compatible with the local runtime environment, a determination that the deployment platform does not include a runtime environment compatible with solution language, and a determination that the deployment platform comprises containerization software compatible with the solution language, wherein the helper program communicates with the launched solution via inter process communication.

15. The at least one non-transitory computer-readable medium of claim 12, wherein the instructions that, when executed by at least one of the one or more computing devices, cause at least one of the one or more computing devices to launch the solution on a remote platform configured to execute the solution further cause at least one of the one or more computing devices to:
    transmit instructions to the remote platform to launch the solution; and
    expose a RESTful endpoint of the launched solution;
    wherein the helper program communicates with the launched solution via requests and responses over hypertext transfer protocol (HTTP).

\* \* \* \* \*